United States Patent
Peretz et al.

(10) Patent No.: US 11,251,628 B2
(45) Date of Patent: Feb. 15, 2022

(54) SYSTEM FOR BALANCING A SERIES OF CELLS

(71) Applicant: RAFAEL ADVANCED DEFENSE SYSTEMS LTD., Haifa (IL)

(72) Inventors: Mor Mordechai Peretz, Lehavim (IL); Ilya Zeltser, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 205 days.

(21) Appl. No.: 16/479,789

(22) PCT Filed: Jan. 22, 2018

(86) PCT No.: PCT/IL2018/050077
§ 371 (c)(1),
(2) Date: Jul. 22, 2019

(87) PCT Pub. No.: WO2018/134827
PCT Pub. Date: Jul. 26, 2018

(65) Prior Publication Data
US 2020/0343739 A1    Oct. 29, 2020

Related U.S. Application Data

(60) Provisional application No. 62/449,137, filed on Jan. 23, 2017.

(51) Int. Cl.
*H02J 7/00* (2006.01)
*H02J 7/34* (2006.01)

(52) U.S. Cl.
CPC .......... *H02J 7/0019* (2013.01); *H02J 7/0016* (2013.01); *H02J 7/0018* (2013.01); *H02J 7/345* (2013.01)

(58) Field of Classification Search
CPC ...... H02J 7/0019; H02J 7/0016; H02J 7/0018; H02J 7/345
(Continued)

(56) References Cited

U.S. PATENT DOCUMENTS

| 5,594,320 | A | * | 1/1997 | Pacholok | ............. H02J 7/0018 320/103 |
| 5,659,237 | A | * | 8/1997 | Divan | .................... B60L 53/22 320/119 |

(Continued)

FOREIGN PATENT DOCUMENTS

| CN | 102437609 | | 5/2012 |
| CN | 102593900 | A * | 7/2012 |

(Continued)

OTHER PUBLICATIONS

"Switching regulator basics: bootstrap, Characteristics and Evaluation Method of Switching Regulators," Tech Web, Published online Feb. 15, 2016, Accessed Online Apr. 28, 2021, https://techweb.rohm.com/knowledge/dcdc/dcdc_sr/dcdc_sr01/829 (Year: 2016).*

(Continued)

*Primary Examiner* — John T Trischler
(74) *Attorney, Agent, or Firm* — Nixon & Vanderhye PC

(57) ABSTRACT

System for balancing series of cells, including circuits each having three or four cells, including: one or two central cells and additional neighboring cells in each circuit, each neighboring cell being adjacent to one central cells; a local capacitor for each neighboring cell, within a local section of each circuit; one global capacitor at a global section which is common to all the circuits; a plurality of controlled switches; a controller which periodically, repeatedly, and alternately opens and closes some switches to: within each circuit, connect each local capacitor in parallel to a respective neighboring cell; within each circuit, connect each local capacitor in parallel to the central cell if one central cell (Continued)

exists, or to another central cell if two central cells exist, respectively; within each circuit, connect said central cells of all circuits separately or simultaneously to said global capacitor.

13 Claims, 30 Drawing Sheets

(58) Field of Classification Search
USPC .......................................................... 320/116
See application file for complete search history.

(56) References Cited

U.S. PATENT DOCUMENTS

| | | | | |
|---|---|---|---|---|
| 5,666,041 A * | 9/1997 | Stuart | ................. | H01M 10/441 320/116 |
| 5,710,504 A | 1/1998 | Pascual et al. | | |
| 5,821,729 A * | 10/1998 | Schmidt | ................. | H02J 7/0018 320/126 |
| 5,932,932 A * | 8/1999 | Agatsuma | ................. | B60K 6/54 307/10.6 |
| 5,982,143 A * | 11/1999 | Stuart | ................. | H02J 7/0018 320/119 |
| 6,081,095 A * | 6/2000 | Tamura | ................. | B60L 58/15 320/118 |
| 6,121,751 A * | 9/2000 | Merritt | ................. | H02J 7/0018 320/116 |
| 6,140,800 A * | 10/2000 | Peterson | ................. | H02J 7/0018 320/118 |
| 6,150,795 A * | 11/2000 | Kutkut | ................. | H02J 7/0018 320/118 |
| 6,157,165 A * | 12/2000 | Kinoshita | ................. | B60L 58/15 320/116 |
| 6,373,223 B1 * | 4/2002 | Anzawa | ................. | H02J 7/0018 320/116 |
| 6,459,236 B2 * | 10/2002 | Kawashima | ................. | H02J 7/0019 320/118 |
| 6,497,974 B2 * | 12/2002 | Fuglevand | ................. | H01M 8/0488 429/432 |
| 6,518,725 B2 * | 2/2003 | Marten | ................. | G06F 1/3237 320/116 |
| 6,538,414 B1 | 3/2003 | Tsuruga et al. | | |
| 6,630,259 B2 * | 10/2003 | Fuglevand | ................. | H01M 16/003 429/432 |
| 6,633,091 B1 * | 10/2003 | Anzawa | ................. | H02J 7/0018 307/52 |
| 7,061,207 B2 * | 6/2006 | Patel | ................. | H02J 7/0018 320/116 |
| 7,081,737 B2 * | 7/2006 | Liu | ................. | H01M 10/441 320/130 |
| 7,091,696 B2 * | 8/2006 | Saigo | ................. | H02J 7/0018 320/120 |
| 7,288,919 B2 * | 10/2007 | Morita | ................. | H02J 7/0016 320/116 |
| 7,352,154 B2 * | 4/2008 | Cook | ................. | H02J 7/1423 320/116 |
| 7,378,818 B2 * | 5/2008 | Fowler | ................. | B60L 53/11 320/119 |
| 7,583,057 B2 * | 9/2009 | Morita | ................. | H02J 7/0016 320/118 |
| 7,696,725 B2 * | 4/2010 | Liu | ................. | H02J 7/0018 320/136 |
| 7,800,346 B2 * | 9/2010 | Bolz | ................. | H02J 7/0018 320/166 |
| 7,812,572 B2 * | 10/2010 | Bolz | ................. | H02J 7/0018 320/166 |
| 7,880,433 B2 * | 2/2011 | Oh | ................. | H02J 7/0016 320/118 |
| 7,888,910 B2 * | 2/2011 | Zeng | ................. | H02J 7/0019 320/118 |
| 7,939,965 B2 * | 5/2011 | Oh | ................. | H02J 7/0016 307/43 |
| 8,004,246 B2 * | 8/2011 | Liu | ................. | H02J 7/0018 320/136 |
| 8,054,044 B2 * | 11/2011 | Kang | ................. | H02J 7/0016 320/118 |
| 8,115,446 B2 * | 2/2012 | Piccard | ................. | H02J 7/0018 320/104 |
| 8,183,870 B1 * | 5/2012 | Davies | ................. | H01M 10/482 324/434 |
| 8,217,623 B2 * | 7/2012 | Oh | ................. | H02J 7/0016 320/118 |
| 8,237,411 B2 * | 8/2012 | Liu | ................. | H02J 7/0018 320/136 |
| 8,390,147 B2 * | 3/2013 | Stauth | ................. | H02J 3/385 307/77 |
| 8,405,349 B2 * | 3/2013 | Kikinis | ................. | H02J 7/0016 320/116 |
| 8,427,107 B2 * | 4/2013 | Firehammer | ................. | H02J 7/0016 320/128 |
| 8,436,582 B2 * | 5/2013 | Pigott | ................. | H02J 7/0018 320/118 |
| 8,518,570 B2 * | 8/2013 | Kudo | ................. | H02J 7/0016 429/91 |
| 8,519,670 B2 * | 8/2013 | Castelaz | ................. | H02J 7/0019 320/118 |
| 8,541,979 B2 * | 9/2013 | Firehammer | ................. | H02J 7/0014 320/118 |
| 8,541,980 B2 * | 9/2013 | Moussaoui | ................. | H02J 7/0016 320/119 |
| 8,692,508 B2 * | 4/2014 | Shimizu | ................. | H02J 7/0016 320/103 |
| 8,766,598 B2 * | 7/2014 | Oh | ................. | H02J 7/0016 320/119 |
| 8,773,070 B2 * | 7/2014 | Kang | ................. | H02J 7/0016 320/118 |
| 8,779,700 B1 * | 7/2014 | Prodic | ................. | H02J 7/0014 318/139 |
| 8,779,722 B2 * | 7/2014 | Lee | ................. | H02J 7/0016 320/118 |
| 8,836,290 B2 * | 9/2014 | Liu | ................. | H02J 7/0018 320/157 |
| 8,837,170 B2 * | 9/2014 | Rosenblad | ................. | H02M 3/3382 363/16 |
| 8,884,580 B2 * | 11/2014 | Roeper | ................. | H02J 7/0019 320/103 |
| 8,928,283 B2 * | 1/2015 | Nakao | ................. | H02J 7/0019 320/119 |
| 8,970,162 B2 * | 3/2015 | Kim | ................. | H02J 7/0019 320/103 |
| 8,981,721 B2 * | 3/2015 | Yamauchi | ................. | B60L 50/16 320/116 |
| 9,000,727 B2 * | 4/2015 | Castelaz | ................. | H02J 7/345 320/118 |
| 9,048,669 B2 * | 6/2015 | Lim | ................. | H02J 7/0019 |
| 9,048,670 B2 * | 6/2015 | Kim | ................. | H02J 7/0019 |
| 9,083,187 B2 * | 7/2015 | Ito | ................. | H02M 7/483 |
| 9,085,243 B2 * | 7/2015 | Chatroux | ................. | B60L 58/22 |
| 9,130,391 B2 * | 9/2015 | Garnier | ................. | H02J 7/0068 |
| 9,142,979 B2 * | 9/2015 | Tsai | ................. | H02J 7/0014 |
| 9,148,029 B2 * | 9/2015 | Tsai | ................. | H02J 7/0016 |
| 9,160,330 B2 * | 10/2015 | Wu | ................. | H03K 17/725 |
| 9,172,257 B2 * | 10/2015 | Touzani | ................. | H02J 7/0018 |
| 9,203,246 B2 * | 12/2015 | Kang | ................. | H02J 7/0014 |
| 9,257,860 B2 * | 2/2016 | Kim | ................. | H02J 7/0068 |
| 9,325,178 B2 * | 4/2016 | Yun | ................. | H02J 7/0019 |
| 9,368,977 B2 * | 6/2016 | Liang | ................. | H02J 5/00 |
| 9,397,508 B2 * | 7/2016 | Moussaoui | ................. | H02J 7/0016 |
| 9,478,995 B2 * | 10/2016 | Hayakawa | ................. | H02J 7/0019 |
| 9,487,095 B2 * | 11/2016 | Ohnuki | ................. | H02J 7/0018 |
| 9,568,930 B2 * | 2/2017 | Castelaz | ................. | B60L 55/00 |
| 9,583,957 B2 * | 2/2017 | Hong | ................. | H02J 7/342 |
| 9,601,931 B2 * | 3/2017 | Tabatabaei | ................. | H02J 7/0019 |
| 9,647,467 B2 * | 5/2017 | Verhaeven | ................. | H02J 7/0016 |
| 9,742,205 B2 * | 8/2017 | Takai | ................. | H01M 10/4207 |
| 9,793,725 B2 * | 10/2017 | Sung | ................. | H02J 7/0022 |
| 9,819,208 B2 * | 11/2017 | Pernyeszi | ................. | H02J 7/0014 |
| 9,864,014 B2 * | 1/2018 | Firehammer | ................. | G01R 31/374 |
| 9,906,189 B2 * | 2/2018 | Ben-Yaakov | ................. | H02M 1/083 |

(56) References Cited

U.S. PATENT DOCUMENTS

| | | | |
|---|---|---|---|
| 9,948,117 B2* | 4/2018 | Lu | H02J 7/0016 |
| 10,014,823 B2* | 7/2018 | Ben-Yaakov | H02M 3/07 |
| 10,063,070 B2* | 8/2018 | Hsiao | H02J 7/35 |
| 10,110,021 B2* | 10/2018 | Hamada | B60L 53/14 |
| 10,135,266 B2* | 11/2018 | Gotz | H02J 7/0019 |
| 10,164,441 B2* | 12/2018 | Moussaoui | H02J 7/0018 |
| 10,236,695 B2* | 3/2019 | Weyen | G01R 31/52 |
| 10,263,434 B2* | 4/2019 | Miyamoto | H01M 10/482 |
| 10,374,424 B2* | 8/2019 | Zhyhinas | H02J 1/12 |
| 10,393,818 B2* | 8/2019 | Din | H02J 7/0014 |
| 10,498,146 B2* | 12/2019 | Wu | H02J 7/0019 |
| 10,505,376 B2* | 12/2019 | Sugeno | H02J 7/0021 |
| 10,536,006 B2* | 1/2020 | Zhang | H02J 7/0019 |
| 10,727,679 B2* | 7/2020 | Zhang | H02J 7/00036 |
| 10,734,818 B2* | 8/2020 | Uno | H01M 10/441 |
| 10,826,303 B2* | 11/2020 | Zhang | H02J 7/0014 |
| 10,828,994 B2* | 11/2020 | Goetz | B60L 58/12 |
| 10,879,706 B2* | 12/2020 | Wang | H02J 7/0019 |
| 10,916,951 B2* | 2/2021 | Zhang | H01M 10/441 |
| 11,011,982 B2* | 5/2021 | Goto | H02M 1/14 |
| 11,027,614 B2* | 6/2021 | Nakao | G01R 31/382 |
| 2002/0017895 A1* | 2/2002 | Kawashima | H02J 7/0019 320/118 |
| 2002/0190692 A1* | 12/2002 | Marten | H02J 7/0018 320/116 |
| 2004/0056639 A1* | 3/2004 | Saigo | H02J 7/0018 320/120 |
| 2004/0113586 A1* | 6/2004 | Chen | H02J 7/0019 320/118 |
| 2004/0246635 A1* | 12/2004 | Morita | H02J 7/0016 361/1 |
| 2004/0257042 A1* | 12/2004 | Liu | H01M 10/441 320/130 |
| 2005/0151509 A1* | 7/2005 | Cook | H02J 7/0018 320/116 |
| 2006/0080012 A1* | 4/2006 | Nishina | B60L 53/11 701/36 |
| 2006/0214636 A1* | 9/2006 | Arai | H01M 10/482 320/116 |
| 2006/0255769 A1* | 11/2006 | Liu | H01M 10/441 320/134 |
| 2007/0001651 A1* | 1/2007 | Harvey | H02J 7/0016 320/166 |
| 2008/0018301 A1* | 1/2008 | Morita | H02J 7/0016 320/119 |
| 2008/0211456 A1* | 9/2008 | Bolz | H02J 7/0018 320/116 |
| 2008/0278969 A1* | 11/2008 | Bolz | H02J 7/0014 363/17 |
| 2008/0309286 A1* | 12/2008 | Hoff | H02J 7/0019 320/107 |
| 2009/0067200 A1* | 3/2009 | Bolz | H02J 7/0014 363/17 |
| 2009/0130541 A1* | 5/2009 | Emori | H02J 7/0019 429/61 |
| 2009/0278489 A1* | 11/2009 | St-Jacques | H02J 7/0016 320/103 |
| 2010/0007308 A1* | 1/2010 | Lee | H02J 7/0018 320/118 |
| 2010/0026241 A1* | 2/2010 | Kang | H02J 7/0016 320/118 |
| 2010/0117593 A1* | 5/2010 | Piccard | H02J 7/342 320/104 |
| 2010/0188046 A1* | 7/2010 | Liu | H02J 7/0018 320/118 |
| 2010/0188047 A1* | 7/2010 | Liu | H02J 7/0018 320/118 |
| 2010/0231166 A1* | 9/2010 | Lee | H02J 7/0021 320/118 |
| 2010/0237830 A1* | 9/2010 | Castelaz | H02J 7/0019 320/118 |
| 2010/0283433 A1* | 11/2010 | Oh | H02J 7/0019 320/162 |
| 2010/0289337 A1* | 11/2010 | Stauth | H02J 3/381 307/77 |
| 2010/0289338 A1* | 11/2010 | Stauth | H02J 7/0016 307/77 |
| 2010/0295510 A1* | 11/2010 | Moussaoui | H02J 7/0016 320/118 |
| 2011/0084668 A1* | 4/2011 | Nakao | H01M 10/482 320/149 |
| 2011/0115436 A1* | 5/2011 | Zhang | B60L 58/12 320/134 |
| 2011/0140662 A1 | 6/2011 | Li | |
| 2011/0221398 A1* | 9/2011 | Ferber, Jr. | B60L 58/12 320/166 |
| 2011/0234164 A1* | 9/2011 | Furukawa | H02J 7/0018 320/118 |
| 2011/0248677 A1* | 10/2011 | Shimizu | H02J 7/0016 320/118 |
| 2011/0298425 A1* | 12/2011 | Liu | H02J 7/0018 320/118 |
| 2012/0007558 A1* | 1/2012 | Pigott | H02J 7/0018 320/118 |
| 2012/0043945 A1* | 2/2012 | Kim | H02J 7/0014 320/167 |
| 2012/0049801 A1* | 3/2012 | Chang | H02J 7/0016 320/132 |
| 2012/0074895 A1* | 3/2012 | Roeper | H02J 7/0019 320/103 |
| 2012/0074906 A1* | 3/2012 | Kang | H02J 7/0016 320/118 |
| 2012/0086390 A1* | 4/2012 | Lim | H02J 7/0019 320/107 |
| 2012/0187774 A1* | 7/2012 | Tabatabaei | H02J 7/0019 307/109 |
| 2012/0194137 A1* | 8/2012 | Wang | H02J 7/0016 320/119 |
| 2012/0200163 A1* | 8/2012 | Ito | H02J 7/0024 307/77 |
| 2012/0206095 A1* | 8/2012 | Marten | H02J 50/12 320/107 |
| 2012/0235494 A1* | 9/2012 | Verhaeven | H02J 7/0016 307/77 |
| 2012/0274283 A1* | 11/2012 | van Lammeren | H01M 10/4207 320/118 |
| 2012/0286733 A1* | 11/2012 | Chang | H02J 7/0018 320/118 |
| 2012/0326671 A1* | 12/2012 | Krause | H01M 10/441 320/126 |
| 2013/0015820 A1* | 1/2013 | Kim | H02J 7/0019 320/128 |
| 2013/0015821 A1* | 1/2013 | Kim | H02J 7/0019 320/128 |
| 2013/0021000 A1* | 1/2013 | Kuraishi | H02J 7/0019 320/118 |
| 2013/0038290 A1* | 2/2013 | Chatroux | B60L 3/0046 320/119 |
| 2013/0076310 A1* | 3/2013 | Garnier | H02J 7/342 320/118 |
| 2013/0093248 A1* | 4/2013 | Liu | H02J 7/007 307/77 |
| 2013/0093395 A1* | 4/2013 | Liu | H02J 7/0016 320/118 |
| 2013/0148382 A1* | 6/2013 | Rosenblad | H02M 3/33584 363/16 |
| 2013/0187605 A1* | 7/2013 | Potts | B60L 58/22 320/112 |
| 2013/0200849 A1* | 8/2013 | Crebier | H01M 10/441 320/116 |
| 2013/0214733 A1* | 8/2013 | Liang | H02J 5/00 320/108 |
| 2013/0249476 A1* | 9/2013 | Touzani | H01M 10/441 320/107 |
| 2013/0300371 A1* | 11/2013 | Bills | H02J 7/00 320/118 |
| 2013/0328530 A1* | 12/2013 | Beaston | H02J 7/00 320/128 |

(56) References Cited

U.S. PATENT DOCUMENTS

| | | | | |
|---|---|---|---|---|
| 2014/0002005 A1* | 1/2014 | Sutardja | ............... | H02J 7/0016 320/103 |
| 2014/0015473 A1* | 1/2014 | Tsai | ............... | G06F 30/20 320/103 |
| 2014/0015474 A1* | 1/2014 | Tsai | ............... | H02J 7/0014 320/103 |
| 2014/0035531 A1* | 2/2014 | Garnier | ............... | H02J 1/08 320/118 |
| 2014/0035532 A1* | 2/2014 | Brandl | ............... | H02J 7/0018 320/128 |
| 2014/0049230 A1* | 2/2014 | Weyh | ............... | H02M 7/483 323/207 |
| 2014/0070757 A1* | 3/2014 | Hong | ............... | H02J 7/0019 320/103 |
| 2014/0077752 A1* | 3/2014 | Barsukov | ............... | H02J 7/0021 320/103 |
| 2014/0084868 A1* | 3/2014 | Yun | ............... | H02J 7/0063 320/118 |
| 2014/0084870 A1* | 3/2014 | Castelaz | ............... | H02J 7/345 320/118 |
| 2014/0139184 A1* | 5/2014 | De Vries | ............... | H02J 7/0019 320/116 |
| 2014/0197795 A1* | 7/2014 | Crebier | ............... | H02J 7/35 320/118 |
| 2014/0203737 A1* | 7/2014 | Prodic | ............... | H02J 7/0014 318/139 |
| 2014/0203778 A1* | 7/2014 | Ohnuki | ............... | H02J 7/0018 320/109 |
| 2014/0225622 A1* | 8/2014 | Kudo | ............... | B60L 50/66 324/433 |
| 2014/0232346 A1* | 8/2014 | Zhang | ............... | H02J 7/0016 320/118 |
| 2014/0239878 A1* | 8/2014 | Yun | ............... | H02J 7/0019 320/103 |
| 2014/0266051 A1* | 9/2014 | Hayakawa | ............... | H02J 7/0018 320/118 |
| 2014/0327399 A1* | 11/2014 | Wu | ............... | H02J 7/00 320/116 |
| 2014/0340022 A1* | 11/2014 | Kang | ............... | H02J 7/0014 320/103 |
| 2015/0061597 A1* | 3/2015 | Mao | ............... | H02J 7/0016 320/122 |
| 2015/0188405 A1* | 7/2015 | Ben-Yaakov | ............... | H02M 3/07 307/52 |
| 2015/0214887 A1 | 7/2015 | Ben-Yaakov et al. | | |
| 2015/0295428 A1* | 10/2015 | Moussaoui | ............... | H02J 7/0016 320/116 |
| 2015/0295429 A1* | 10/2015 | Moussaoui | ............... | H02J 7/0018 320/116 |
| 2015/0340886 A1* | 11/2015 | Sung | ............... | H02J 7/0016 320/118 |
| 2015/0357843 A1* | 12/2015 | Kobayashi | ............... | H02J 7/0016 320/118 |
| 2016/0043578 A1* | 2/2016 | Miyamoto | ............... | H02J 7/0014 320/118 |
| 2016/0105039 A1* | 4/2016 | Jeon | ............... | H01M 10/425 320/128 |
| 2016/0111900 A1* | 4/2016 | Beaston | ............... | H02J 7/0014 320/134 |
| 2016/0318411 A1* | 11/2016 | Goetz | ............... | B60L 58/20 |
| 2017/0033700 A1* | 2/2017 | Ishigaki | ............... | H02J 7/0014 |
| 2017/0110893 A1* | 4/2017 | Cao | ............... | H02J 7/0016 |
| 2017/0163035 A1* | 6/2017 | Zhyhinas | ............... | H02J 7/0014 |
| 2017/0163160 A1* | 6/2017 | Din | ............... | H02J 7/0016 |
| 2017/0271889 A1* | 9/2017 | Sugeno | ............... | H01M 10/0525 |
| 2018/0019606 A1* | 1/2018 | Kang | ............... | H02J 7/342 |
| 2018/0205238 A1* | 7/2018 | Uno | ............... | H02M 7/483 |
| 2018/0248385 A1* | 8/2018 | Zhang | ............... | H02J 7/0019 |
| 2018/0269697 A1* | 9/2018 | Zhang | ............... | H02J 7/0031 |
| 2018/0358818 A1* | 12/2018 | Zhang | ............... | H02J 7/045 |
| 2019/0039476 A1* | 2/2019 | Nakao | ............... | B60L 58/12 |
| 2019/0097441 A1* | 3/2019 | Chen | ............... | H02J 7/0029 |
| 2019/0103750 A1* | 4/2019 | Kristensen | ............... | H02J 7/0016 |
| 2019/0115769 A1* | 4/2019 | Chen | ............... | H02J 7/045 |
| 2019/0148952 A1* | 5/2019 | Remboski | ............... | H02J 7/0021 320/128 |
| 2019/0229538 A1* | 7/2019 | Zhang | ............... | H02J 7/00712 |
| 2019/0288520 A1* | 9/2019 | Abdel-Monem | ............... | G01R 31/392 |
| 2019/0319463 A1* | 10/2019 | Yang | ............... | H02J 50/10 |
| 2019/0375311 A1* | 12/2019 | Shen | ............... | B60L 53/22 |
| 2020/0021118 A1* | 1/2020 | Wang | ............... | H02J 7/0024 |
| 2020/0059106 A1* | 2/2020 | Karlsson | ............... | B60L 58/22 |
| 2020/0106276 A1* | 4/2020 | Zhang | ............... | H02J 7/04 |
| 2020/0112179 A1* | 4/2020 | Gray | ............... | H02J 7/0016 |
| 2020/0185931 A1* | 6/2020 | Stuart | ............... | H02J 7/345 |
| 2020/0185934 A1* | 6/2020 | Zavodny | ............... | H02J 7/0019 |
| 2020/0207219 A1* | 7/2020 | Slepchenkov | ............... | B60K 17/34 |

FOREIGN PATENT DOCUMENTS

| | | | | |
|---|---|---|---|---|
| CN | 104300640 A | * | 1/2015 | |
| CN | 105609887 | | 5/2016 | |
| EP | 3261168 A4 | * | 4/2018 | ............ H01M 10/42 |
| GB | 2536657 A | * | 9/2016 | ............ H02J 7/0024 |
| JP | 2000-166113 | | 6/2000 | |
| TW | 201246751 | | 11/2012 | |
| WO | WO-9815047 A1 | * | 4/1998 | ........ H01M 10/4264 |
| WO | WO-2018075793 A1 | * | 4/2018 | ............ G01R 31/371 |

OTHER PUBLICATIONS

Ben-Yaakov et al., "Design and evaluation of a modular resonant switched capacitors equalizer for PV panels," in 2012 IEEE Energy Conversion Congress and Exposition, 2012, pp. 4129-4136.

Blumenfeld et al., "Enhanced differential power processor for PV systems: Resonant switched-capacitor gyrator converter with local MPPT," in Proc. IEEE Appl. Power Electron. Conf. Expo., Mar. 2014, pp. 2972-2979.

Dahan et al., "Cell-level hybrid architectures for active balancing of serially-connected batteries" In Applied Power Electronics Conference & Exposition (APEC), IEEE, Mar. 1, 2017, pp. 2382-2389.

Zeltser et al., "ZCS resonant converter based parallel balancing of serially connected batteries string," in Proc. IEEE Appl. Power Electron. Conf. Expo., Mar. 2016, pp. 802-809.

Zhang et al., "A Hierarchical Active Balancing Architecture for Lithium-ion Batteries," in IEEE Trans. Power Electron., vol. PP, No. 99, pp. 1-1.

International Search Report for PCT/IL2018/050077 dated May 17, 2018, 5 pages.

Written Opinion of the ISA for PCT/IL2018/050077 dated May 17, 2018, 4 pages.

Search Report issued in EP Appln. No. 18742367.8 dated Jun. 4, 2020.

* cited by examiner

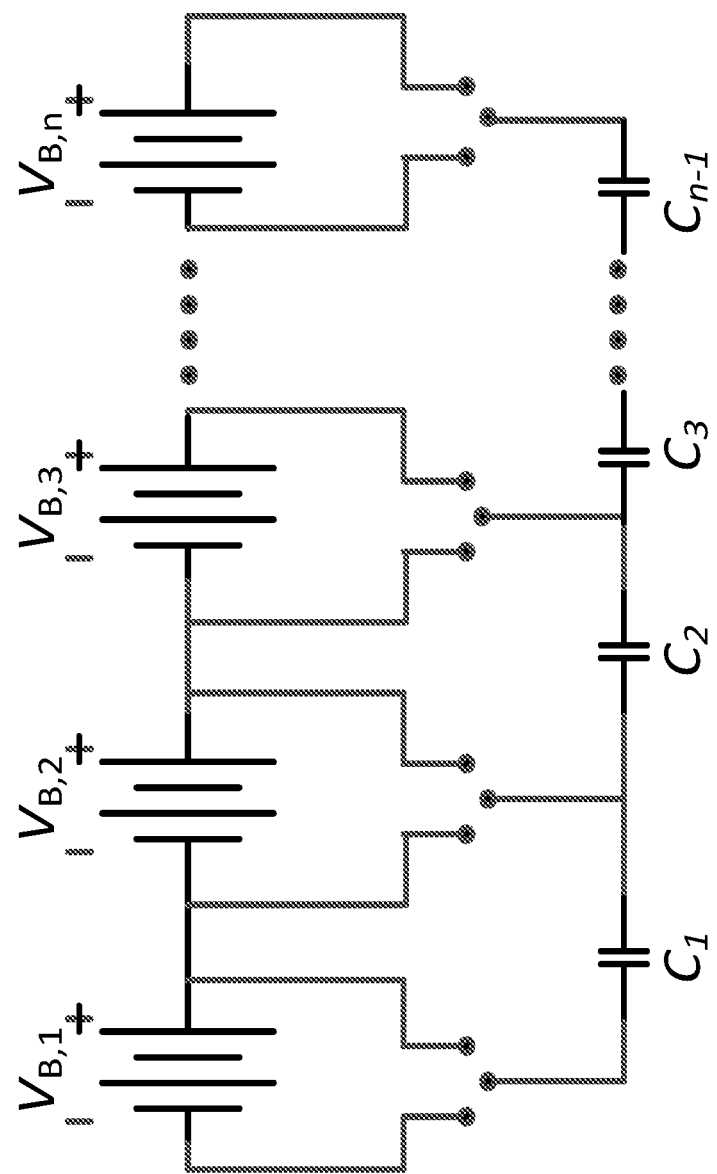
Fig. 1(a) – Prior Art

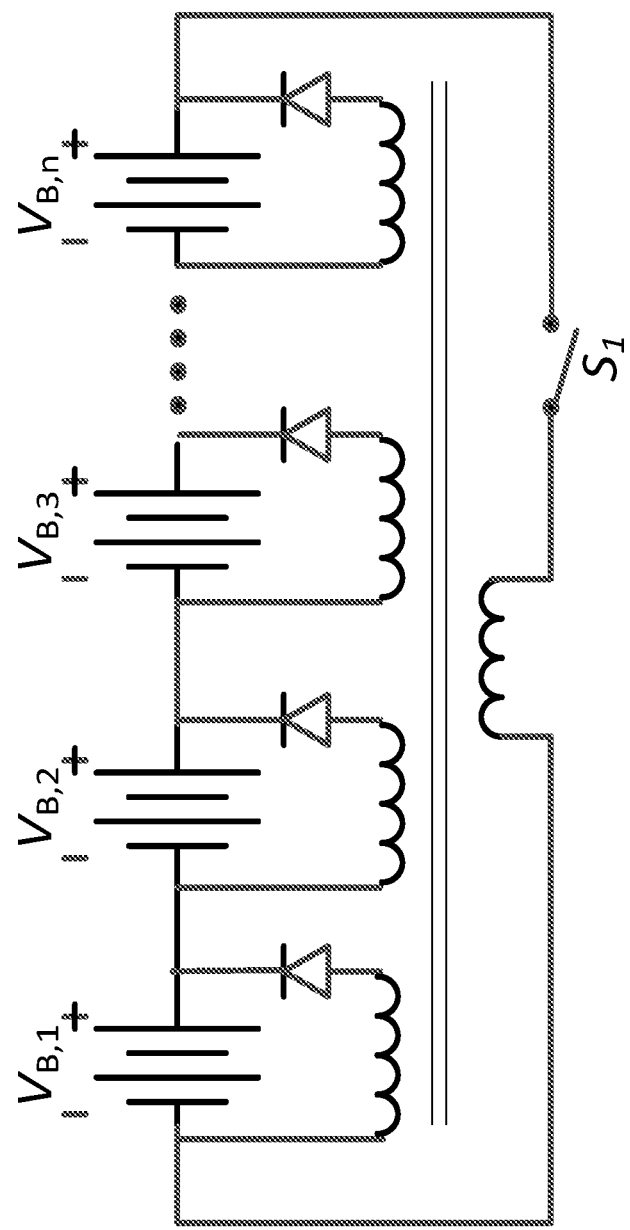
Fig. 1(b) – Prior Art

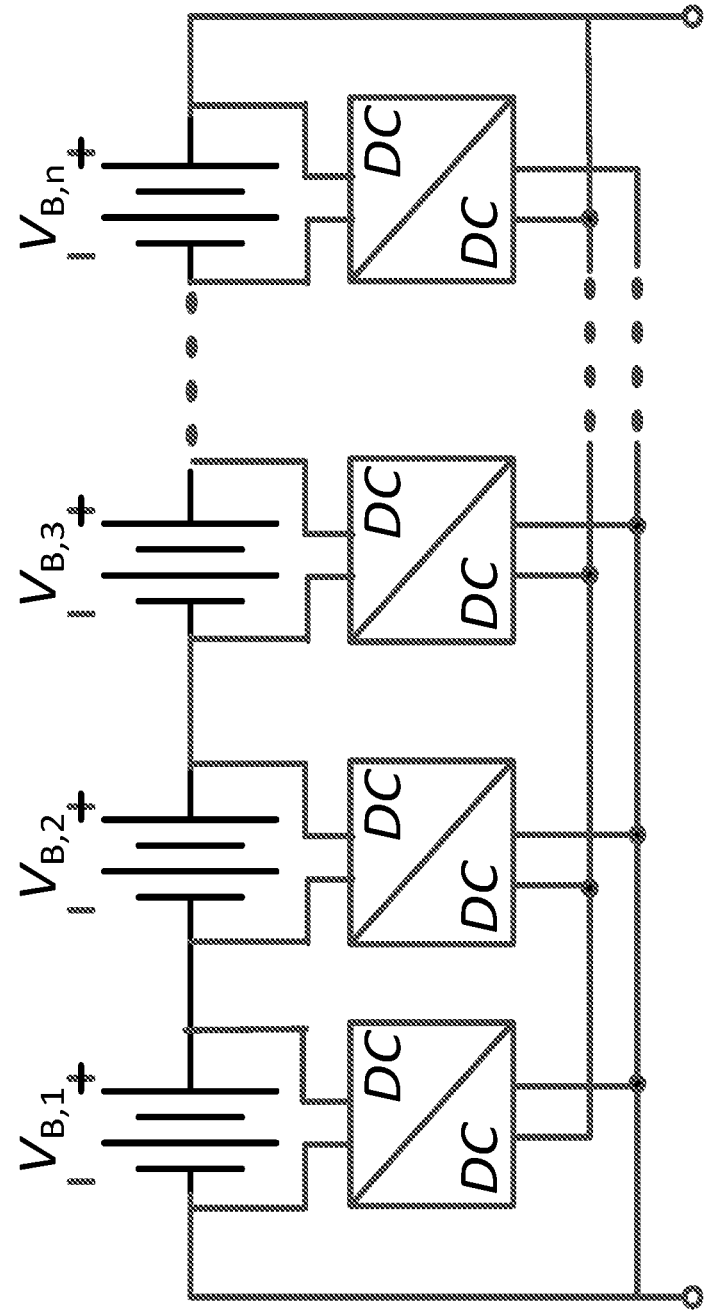
Fig. 1(c) – Prior Art

Simulation results for 6 batteries cells (2 modules) emulated by large capacitors Waveforms of the current across $L$ for the case that $0.5V_{cell} > V_{bus}$.

Simulation results for 8 batteries cells (2 modules) emulated by large capacitors.

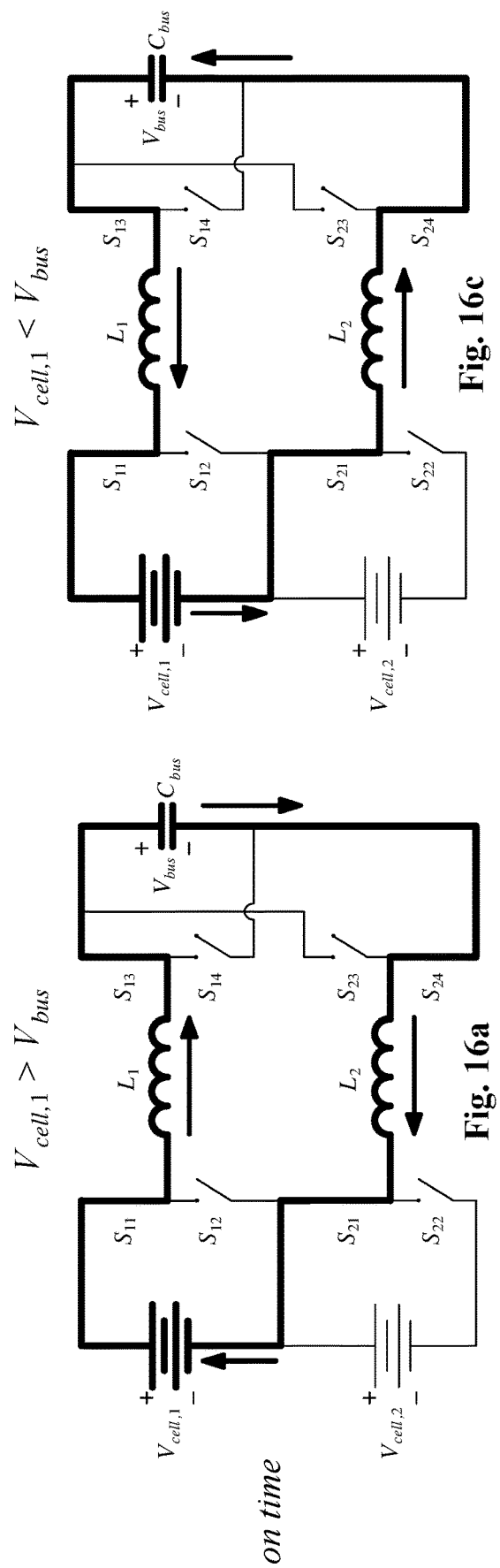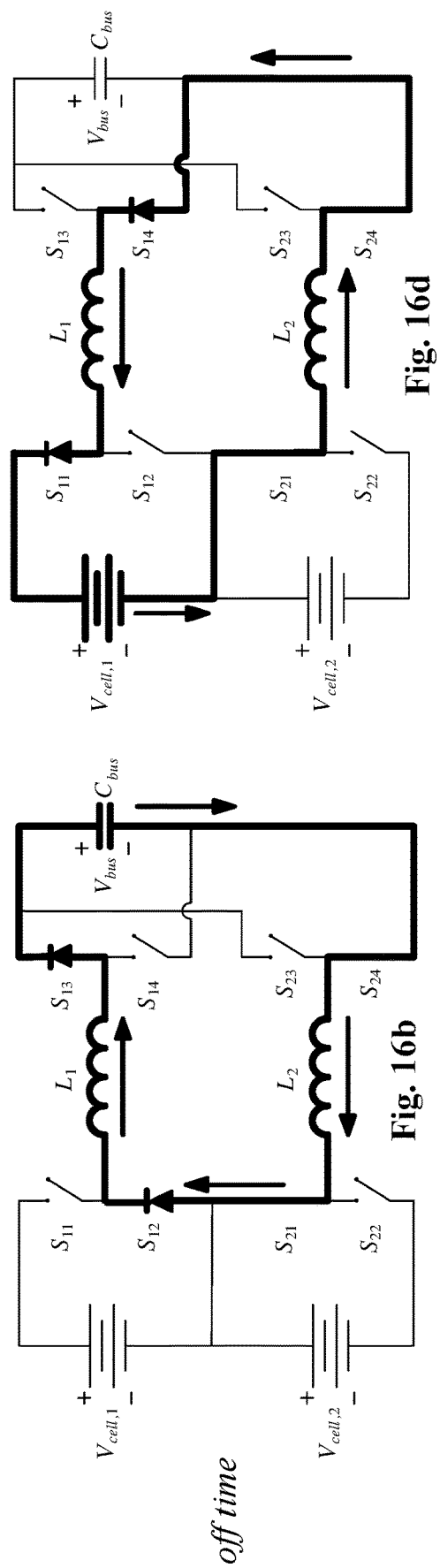
Fig. 16a, Fig. 16b, Fig. 16c, Fig. 16d

SYSTEM FOR BALANCING A SERIES OF CELLS

This application is the U.S. national phase of International Application No. PCT/IL2018/050077 filed Jan. 22, 2018 which designated the U.S. and claims priority to U.S. Provisional Patent Application No. 62/449,137 filed Jan. 23, 2017, the entire contents of each of which are hereby incorporated by reference.

FIELD OF THE INVENTION

The present invention relates to the field battery charging and balancing. More particularly, the invention relates to a hybrid-type system and method for balancing serially-connected batteries.

BACKGROUND OF THE INVENTION

Batteries, or other types of DC sources cells, such as solar cells (hereinafter all interchangeably referred to as "batteries" or "cells") have been widely used in various applications as energy storage elements and power sources. To achieve the high voltage and high power required in applications such as electric vehicle (EV) and its derivatives, large numbers of battery cells are connected in series. Several potential flaws may lead to imbalances along the string, among them degradation with aging, manufacturing and environmental variances, charging and discharging, thermal conditions and internal impedance imbalance. These non-idealities also reflect on the cells' lifetime and lower the string's performance, reliability and efficiency. Therefore, strings of serially connected batteries must be assisted by a balancing circuit to minimize imbalances and improve the overall performance.

For example, charging of an imbalanced string of batteries may involve either a too early termination of charging when some of the batteries are not fully charged, or a too late termination that may cause damage to some of the battery cells that are overcharged. Moreover, if, for example, one of the batteries is faulty such that it can output only a very low level current, the current of the entire string converges to this minimal current level, and the energy which is supplied is substantially degraded.

In the majority of commercial battery balancing applications, primarily due to cost and simplicity, the passive balancing approach is predominant. There, the excess energy of each cell dissipates through either a resistor or transistor. From an energy efficiency perspective, this concept is lossy and a seek for alternative sustainable balancing options has been widely investigated in recent years. In the active balancing approach, power converters are employed to evenly distribute the energy along the series string. Typically, in this configuration energy is transferred from cells of higher voltage to cells of lower voltage. In more sophisticated designs, the energy transfer is carried out according to the cells' State-of-Charge (SOC). Active balancing can be realized in a variety of ways for example using switched capacitors converters (SCC), switched inductor converters, or multi-winding transformer-based converters.

Another important classification of active balancing circuits is in the power flow structure, i.e., series balancing, parallel balancing or hierarchical balancing. In a series balancing, energy is transferred from one neighboring cell to another using a power converter that links between two adjacent cells and acts as a local bypass to the energy flow in the case that a cell is damaged or has lower energy. Transferring charge over such a distance of several serially linked cells necessitates many conversions resulting in energy losses respectively. Parallel balancing is assisted by a small energy storage component, typically a capacitor, and often referred to as an energy buffer, which is used as a link to transfer energy from a charged cell to the cell that needs to be charged without the need to process an energy transfer through the whole batteries string. Therefore, an apparent advantage of the parallel balancing approach is the fewer amount of conversions to balance the string, and as a result a faster balancing with higher efficiency especially in large arrays. However, the parallel approach typically involves a high component count and a more complex control algorithm, which increases the complexity and cost of this solution.

The hierarchical-type balancing structure combines the series and parallel approaches. The hierarchical structure enables more power-flow paths, and as a result, it expedites the balancing convergence speed. However, the faster conversion comes at the cost of an extra conversion stage that affects the efficiency of the system, and an increase of the component count. As shown, for example, in Z. Zhang; H. Gui; D. J. Gu; Y. Yang; X. Ren, "A Hierarchical Active Balancing Architecture for Lithium-ion Batteries," in *IEEE Trans. Power Electron.*, vol. PP, no. 99, pp. 1-1, the hierarchical structures of the prior art typically apply multiple and separate converters: a set of converters carries out a series balancing, whereas a different decoupled set of converters establishes a parallel connecting link. In another alternative of hierarchical balancing a modular approach is carried out. In a similar manner, it employs multitude of independent converters to balance a so-called 'layer' or 'module', i.e. string of serially connected batteries.

Still another drawback of balancing structures of the prior-art, whether implemented as series, parallel, modular or hierarchical structure, is that even when the string is perfectly balanced, there is some current flow in the circuit. Such current flow significantly reduces the efficiency of the system. Furthermore, some of the structures of the prior art require use of sensors for their proper operation. This use of sensors adds to the complexity of the entire system.

In another aspect, a modularization of the balancing system is desired. More specifically, an isolation between a bus (global) capacitor and the battery cells, for example, by means of a transformer enables the topology to be extended. This modularization provides another stage of balancing and enables operation at a lower voltage stress, which can expedite the balancing speed since higher current can be delivered for the same power dissipation.

It is an object of the present invention to provide a sensor-less hierarchical balancing structure having a simple implementation and reduced component count.

It is a more specific object of the invention to provide a hybrid-hierarchical balancing system which utilizes a single set of primary switches for carrying out both the series cell-balancing and the parallel cell-balancing.

It is another object of the invention to provide a hierarchical balancing structure in which there is no quiescent power loss due to a flow of current at times when the batteries are balanced.

It is still another object of the invention to provide such hierarchical structure which is modular.

Other objects and advantages of the present invention will become apparent as the description proceeds.

SUMMARY OF THE INVENTION

The invention relates to hierarchical-hybrid system for balancing a series of cells, said cells are divided into m modules, each module having k cells, which comprises: (A) one or two central cells in each module and additional neighboring cells, each neighboring cell being adjacent to one of said central cells; (B) two local capacitors within a local section of each module, each of said local capacitors being periodically, repeatedly, and alternately connected (a) in parallel to one of said neighboring cells, or (b) in parallel to a respective central cell; (C) one global capacitor at a global section of each module which is common to all said modules, said global capacitor receiving respective charging signals either directly or through an isolation element, separately or simultaneously from several central cells of different of said modules, thereby to charge said global capacitor to a voltage level which is identical or proportional to the average voltage level of said central cells of all said different modules; (D) a plurality of controlled switches for carrying out said alternate connections of said local capacitors, and for forming said charging signals that are provided to said global capacitor; and (E) a controller for controlling the opening and closure of said controlled switches; wherein some of said controlled switches that are used to alternately connect said local capacitors to the respective cells at each module are also commonly used at said module to simultaneously produce said charging signals for charging the global capacitor; and wherein a connecting circuitry which comprises one or more reactive components (such as capacitors and/or inductors) and at least a portion of said controlled switches is used to connect said local section of each module to said global section.

Preferably, said local capacitors are used within each module in a serial balancing process, and said global capacitor is used in a parallel balancing process to balance the central cells of all modules.

Preferably, said local capacitors are used within each module in a parallel balancing process, and said global capacitor is used in a serial balancing process to balance the central cells of all modules.

Preferably, said connecting circuitry, by means of said charging signals, transfers charge quantities that are proportional to the voltage difference between respective central cell of the module and said global capacitor.

Preferably, a current through said connecting circuitry has a discontinuous nature, whose amplitude is proportional to a voltage difference between the local cell and the global capacitor, respectively, and the form of the current also depends on the type and parameters of the components, and the switching sequence of said controlled switches of said connecting circuitry.

Preferably, the system is characterized by zero charge transfer and zero current flow between all or number of cells, or between all or number of cells and global capacitor when said cells are balanced.

Preferably, the states of said controlled switches are alternated at a high frequency rate, therefore a convergence towards voltage balancing is formed through multiple high frequency cycles, simultaneously at all modules.

Preferably, the states of the controlled switches are cyclically altered, while at each said high frequency cycle a charge quantity is transferred from cells or capacitors of higher voltage to either cells or capacitors of lower voltage, respectively, and wherein a bidirectional current flow from a higher voltage cell or capacitor to a lower voltage cell or capacitor, whichever is the case, is naturally facilitated without sensing elements nor differential control.

Preferably, a transformer is used as an isolation element when said charging signals are provided indirectly to said global capacitor, said transformer comprising a primary and secondary sides, while said global capacitor is located at the secondary side.

Preferably, said transformer comprising a number of primary sides and only one secondary side.

Preferably, the system further comprises a serial inductance at said primary side of the transformer, said inductance is subjected on its first end to a DC voltage which is equal or directly proportional to a voltage of a respective cell, and it is also subjected at its second end to another DC voltage which is equal or directly proportional to the voltage of said global cell, the current which flows through said inductance is linearly changed in a linear slope which is proportional to the voltage difference between the voltage of the respective central cell and between the voltage of the global capacitor.

Preferably, said serial inductance in the primary side of the transformer is realized either by a leakage inductance of the primary coil of the transformer, or by an additional inductor which is provided in series to the primary of the transformer.

Preferably, the system comprises an additional series capacitor, which together with said serial inductor forms a series resonant-type circuit, said resonant-type circuit is subjected at a first of its ends to DC voltage which is equal or directly proportional to the voltage of a respective central cell, and it also subjected at its second end to another DC voltage which is in turn equal or directly proportional to the voltage of said global capacitor, the current through said series resonant-type circuit is changed in a sinusoidal shape whose amplitude is proportional to the voltage difference between the voltage of a respective central cell and the voltage of the global capacitor.

In another aspect, the invention relates to a system for balancing serially connected cells, said cells are divided into m modules, each module having one cell, which comprises: (A) a local inductor having two sides, a first proximate side which is proximate to the cell, and a second distal side which is proximate to a global capacitor; (B) a pair of proximate switches that are located between said proximate side of the inductor and said cell; (C) a pair of distal controlled switches that are located between said distal side of the inductor and said global capacitor; wherein each cycle for charge transfer between the cell and said global capacitor uses a closed transfer circuit which in turn comprises said local inductor and a similar inductor of a proximate module.

Preferably, each of said switches is a MOSFET type switch.

Preferably, the control over the switches is performed by a bootstrap element.

BRIEF DESCRIPTION OF THE DRAWINGS

The present invention is illustrated by way of example in the accompanying drawings, in which similar references consistently indicate similar elements and in which:

FIGS. 1(a) to 1(c) illustrate some prior art balancing structures;

FIG. 16 shows various operational states of the embodiment of FIG. 15;

DETAILED DESCRIPTION OF THE INVENTION

Figure 2:
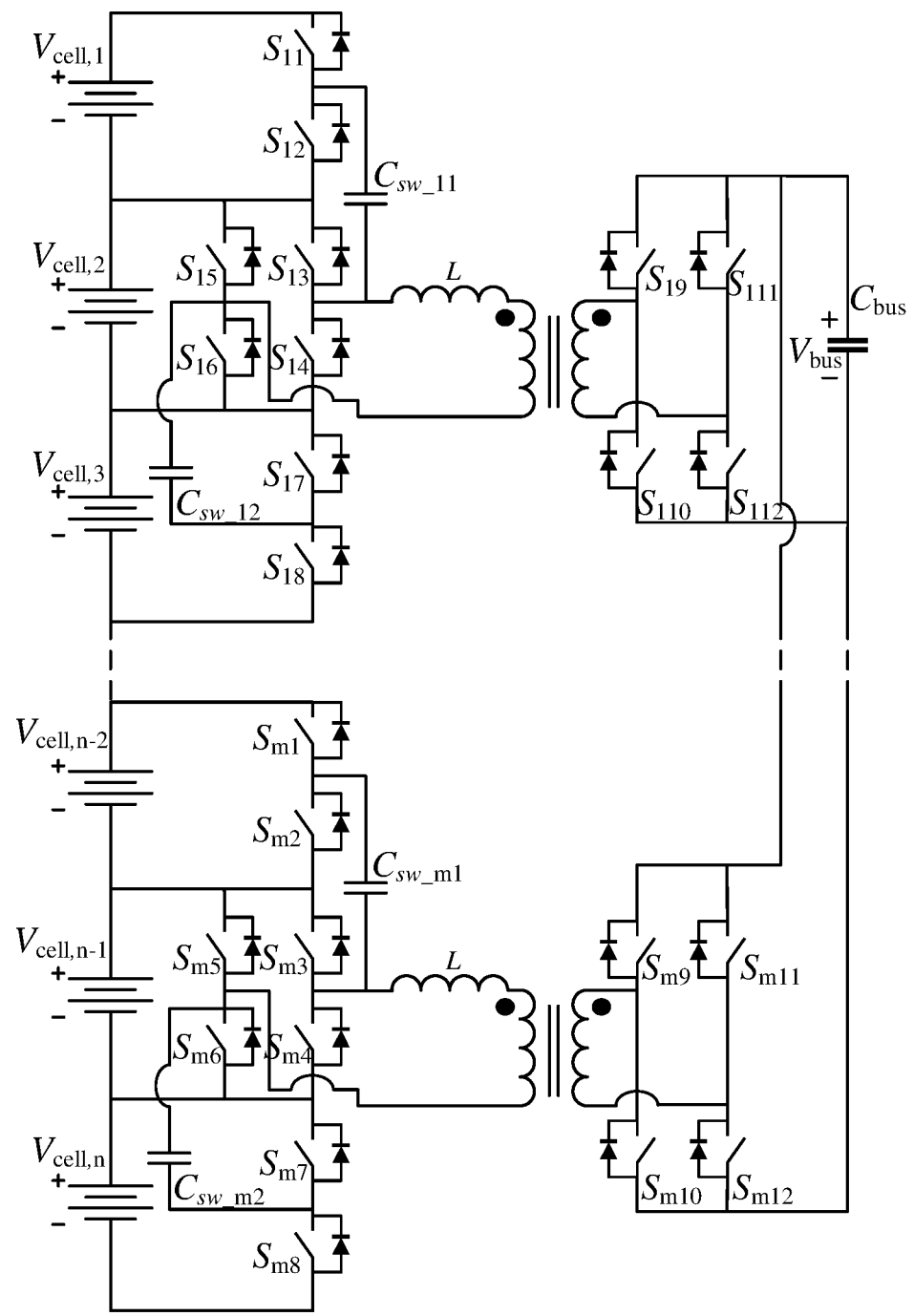
FIG. 2 illustrates an embodiment of the present invention.

Three typical active balancing schemes are shown in FIGS. 1(a) to 1(c).

A switched-capacitor balancing scheme is generally shown in FIG. 1 (a). This scheme is relatively simple in structure and control, however, it is characterized by a long convergence time due to a sequential balancing, particularly when there is a necessity for a charge transfer through many battery cells.

A multi-winding transformer scheme is generally shown in FIG. 1(b). This scheme enables a short convergence time and simple control, but is expensive and not modular.

FIG. 1 (c) generally shows a parallel scheme which utilizes a plurality of DC-DC converters, one for each cell. Here, a fast convergence and modularity are obtained, however, this scheme involves a high magnetic component count, and the control over the components of the system is quite complex.

A hierarchical-type structure is also commonly known. As previously noted, the hierarchical structure combines a serial scheme with a parallel scheme. This prior art scheme, however, suffers from a high component count, among others, due to the use of two separate sets of switches, one for the serial scheme, and another one for the parallel scheme. In more general terms, the hierarchical structures of the prior art typically apply multiple and separate converters: a set of converters carries out a series balancing, whereas a different decoupled set of converters establishes a parallel connecting link.

The prior art scheme suffers from still another drawback—as current flows within this scheme even during a fully balanced state. As will be discussed, the present invention overcomes these two drawbacks.

The present invention relates to hybrid structures for active balancing of a serially connected string of batteries. The structures of the present invention feature simple sensor-less implementation, modularity, design flexibility and reduced component count. A major point of the balancing concept of the invention is that by merging two active balancing approaches (in a manner as will be explained herein), additional power paths between battery cells are created, but without the penalty of extra conversion stages. Furthermore, the balancing system operates in DCM (Discontinuous Current Mode)—the inductor current starts at zero and returns to zero, for every switching period and energy is transferred according to voltage difference between the cells. Therefore, no energy circulates in the system when the cells are balanced, resulting in expedited convergence and low power losses.

The necessity of multiple energy paths for the action of balancing dc sources stems primarily from the tradeoff between the complexity of the system and the convergence characteristics (e.g., losses, duration etc.). The use of a hybrid-type balancing structure enables the flexibility in modular operation without extra conversion stages. This advantage becomes further apparent for cases that long strings are considered.

The hybrid-balancing of the present invention is implemented by a serial balancing with a parallel link and by a setup that serially links parallel modules. The present invention utilizes the link between modules without interference of the primary power flow and minimal hardware additions. In the present invention, each string consists of n cells and balanced using m modules where each module is in charge of balancing k cells, hence n=mk.

According to a first aspect of the present invention (series balancing with a parallel link), the balancing of the serially connected battery string is performed by serially balancing the battery cells within each module and connecting at least one of the battery cells in the module in a parallel manner to an energy buffer, e.g., a capacitor (hereinafter, "global capacitor"). The global capacitor is in balancing contact with one or two central battery cells in each of the modules. Thus, the cell voltages within each module are each affected by their adjacent cell voltage, by either receiving extra energy (charge/voltage) from an adjacent cell having a higher voltage, or contributing/transferring energy (charge/voltage) to an adjacent cell having a lower voltage. The central cell within each module that is in balancing contact with the energy buffer capacitor (namely, the global capacitor) either affects the voltage of the global capacitor by transferring charge thereto (in case its voltage is higher than that of the global capacitor) or is affected by the voltage of the global capacitor by receiving charge therefrom (in case its voltage is lower than that of the global capacitor). Eventually, each of the central battery cells within each of the modules, respectively, becomes balanced due to its interaction with the global capacitor, while the rest of the adjacent cells are balanced relative to the respective central battery cell—thus after some merging period, the entire string becomes fully balanced.

The system structure shown in FIG. 2, shows equalization of the voltage of all the cells to their average value using a serial Differential Power Processor (DPP) and a common bus energy buffer, e.g. capacitor, for the parallel power flow. The parallel balancing is facilitated by utilizing conduction paths of a neighboring module to link with the global capacitor $C_{bus}$. Thus, the energy buffer capacitor $C_{bus}$ is connected in parallel with each of the modules. An additional significant advantage of the present invention topology is that the quiescent power loss is minimal since no energy circulates in the system when the batteries are balanced.

The balancing system depicted in FIG. 2 enables adding of a parallel power path to an already existing serial balancing structure, which is in turn uses two "local" capacitors $C_{sw}$ and respective switches that are timely activated to balance the voltage between each adjacent cell and its neighboring central cell. As can be realized, the string is in fact balanced using a serial DPP that uses a switched capacitor converter (SCC). The parallel link is facilitated by connecting the primary side of a transformer to the switching nodes of a SCC module via an inductor (can be replaced by the transformer's leakage inductance), whereas the secondary side of the transformer connects to a global capacitor through a bridge rectifier. In such a manner, the global capacitor links to other modules and additional energy paths are formed that potentially expedite the balancing speed and reduce the amount of conversions to equalize distant cells. It should be noted that the primary side of the parallel link can be realized in a variety of ways, for example as a full-bridge assembly as shown in FIG. 2, or in case that the DPPs are synchronized, a half-bridge configuration is sufficient as depicted, for example, in FIG. 3.

The principle of operation is now described for the system of FIG. 2. The switching frequency is set the same for the switches at the primary side of the transformer and for those at the secondary side (those at the secondary side are used solely in the parallel link). As will be shown, the switches at the primary side of each module are common to both the serial link within this module and to the parallel link, therefore in that sense the system in fact becomes "hybrid". The switches at the primary side of the transformer, as well to those at the secondary side all receive control from a same control unit (not shown). To avoid a scenario that the inductor of a parallel link (namely, the inductor at the primary of the transformer) connects to a cell with a nonzero current, the operation of these modules is set to DCM (Discontinuous Current Mode)—the inductor current starts at zero and returns to zero, for each switching period. This further simplifies the circuitry for a bidirectional operation, as the circuit does not use sensors, while it can use smaller magnetic elements.

For reasons of symmetry, the parallel circuits have been assigned to the middle (central) cells of each module. The global (bus) capacitor $C_{bus}$ holds the average voltage of the pack $V_{bus}$, which is a common voltage for all modules. Assuming that a one parallel link is used every k=3 cells, $V_{bus}$ can be expressed as:

$$V_{bus} = \frac{1}{m}\sum_{k=1}^{m} V_{cell,3k-1} \quad (1)$$

It should be noted that since isolation is used and each of the secondary circuits has an independent rectifier, the balancing action per cell is independent of the other cells in the string. This means that no synchronization between modules is required. The SCC can be activated in several operation modes, namely complete-charge, partial-charge or no-charge. The operation of the SCC as DPP forces voltage equalization between adjacent cells, as described in depth in the following references:

US 2015/0214887;

A. Blumenfeld, A. Cervera and M. M. Peretz, "*Enhanced differential power processor for PV systems: Resonant switched-capacitor gyrator converter with local MPPT,*" in Proc. IEEE Appl. Power Electron. Conf. Expo., pp. 2972-2979, March 2014;

S. Ben-Yaakov, A. Blumenfeld, A. Cervera and M. Evzelman, "*Design and evaluation of a modular resonant switched capacitors equalizer for PV panels,*" in 2012 IEEE Energy Conversion Congress and Exposition, 2012, pp. 4129-4136;

C. Pascual and P. T. Krein, "*Switched capacitor system for automatic battery equalization,*" U.S. Pat. No. 5,710,504, Jan. 20, 1998.

The balancing operation of one module within an entire string of cells, each module comprising 3 battery cells, is described in the sub-circuits of FIGS. 4(a)-4(d), and in the simplified circuits of FIGS. 5A-5D respectively. To distinguish the contribution of the series and parallel balancers, the current flow per mode and direction are highlighted in FIGS. 4A-4D for each time interval respectively, for a case that:

$$V_{cell,2} > V_{bus}, V_{cell,1} > V_{cell,2} > V_{cell,3}$$

As noted, each module comprises three cells Cell,1, Cell,2 and Cell,3, that are connected in series and having a voltage of $V_{cell,1}$, $V_{cell,2}$ and $V_{cell,3}$, (respectively). During the serial operation (and locally within each module), Cell,1 is balanced against Cell,2, and Cell,3 is also balanced against Cell,2. More specifically, Cell,1 is balanced against Cell,2 by first connecting $C_{sw1}$ in parallel to Cell,1, and in the next period $C_{sw1}$ is connected in parallel to Cell,2. A similar procedure is performed with respect to the balancing of Cell,3 against Cell,2.

The current $i_{sw}$ represents the current that is processed by the series path ($i_{sw1}$ via the capacitor $C_{sw1}$ and $i_{sw2}$ via the capacitor $C_{sw2}$). The inductor current $i_L$ indicates the current that flows through the primary side of the parallel link (transformer). The switching period is divided into two equal intervals: $t_1 = t_{on1} + t_{off1}$ and $t_2 = t_{on2} + t_{off2}$. In the first half-cycle $t_1$, the switches $S_1$, $S_3$, $S_6$, $S_8$, $S_9$ and $S_{12}$ are turned on for $t_{on1}$ (shown in FIG. 4a), allowing the current to flow in both directions. During this interval, the current flows from cell,1 to $C_{sw1}$, from $C_{sw2}$ to cell,3 and from cell,2 to the bus capacitor $C_{bus}$. Simplified equivalent circuits for the operation of the parallel link and the SCC are depicted in FIG. 5(a) to FIG. 5(d), respectively—all assume for the sake of simplicity use of a 1:1 ratio between the primary and secondary of the transformer (although use of this ration is not a necessity). In the following time interval, $t_{off1}$ (shown in FIG. 4b), the switches are turned off, $i_{sw1}$ and $i_{sw2}$ are zero and $i_L$ flows through the body diodes of $S_4$, $S_5$, $S_9$ and $S_{12}$ until the current becomes zero, and the current remains zero until the next switching period.

Figure 5A:
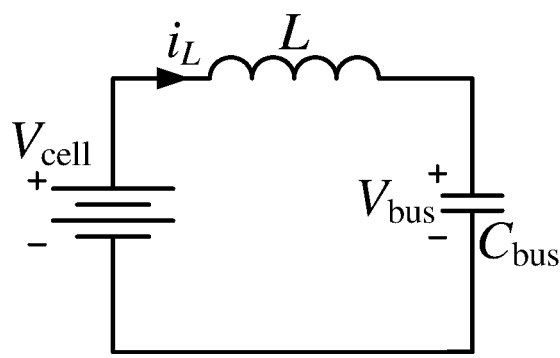
FIGS. 5(a)-5(d) are simplified circuits of the states shown in FIGS. 4(a)-4(d)
Figure 5B:
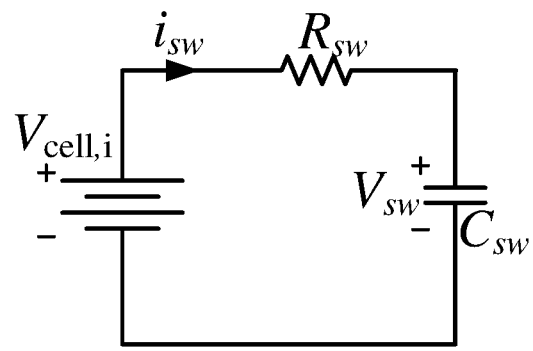
Figure 5C:
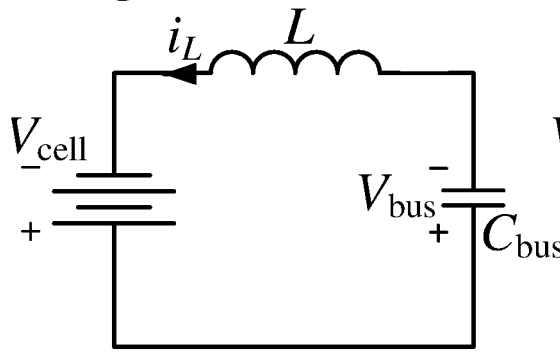
Figure 5D:
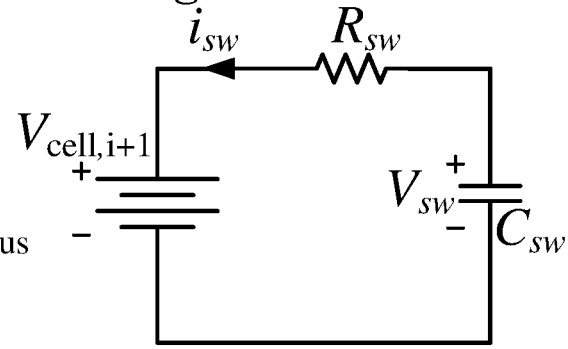

In the second half-cycle, $t_2$, switches $S_2$, $S_4$, $S_5$, $S_7$, $S_{10}$ and $S_{11}$ are turned on for tone (shown in FIG. 4c) so that cell,1 and cell,3 are idle and cell,2 is balanced. Throughout this interval current flows from $C_{sw1}$ to cell,2, and from cell,2 to $C_{sw2}$ and to the bus capacitor $C_{bus}$ (via the transformer). FIGS. 5*c* and 5*d* show the equivalent circuits during this interval. In the next time interval, $t_{off2}$ (shown in FIG. 4*d*), the switches are turned off, $i_{sw1}$ and $i_{sw2}$ are zero and $i_L$ flows through the body diodes of $S_3$, $S_6$, $S_{10}$ and $S_{11}$ until the current becomes zero—this current remains zero until the next switching period. The serial-balancing current depends on the voltage difference between nearby cells, whereas for the parallel link it depends on the voltage difference between the respective central cell and the voltage $V_{bus}$ of the global capacitor $C_{bus}$. The resulting current for the primary side of the parallel link (transformer) can be expressed as:

$$i_L = \frac{\Delta V_{int}}{L} t \qquad (2)$$

where the index int={on1, off1, on2, off2} refers to the time interval of operation, and $\Delta V_{int}$ refers to the applied voltage on the inductance of the parallel link, reflected to the primary side.

The voltage $V_{bus}$ over the global capacitor $C_{bus}$ is affected by all of the central battery cells of all the modules. Thus all of the modules affect $V_{bus}$ and $V_{bus}$ affects all modules, whereas the current direction is always from either the respective central cell to $C_{bus}$ or vice versa (always from the component having a higher voltage level to the one having a lower voltage level). This procedure repeats in a high rate (for example, 200 kHz) such that a small amount of charge passes during each period to the respective direction. Eventually, $V_{bus}$ converges to the average voltage of all of the serially connected cells and vice versa, all the serially connected cells converge to this average voltage.

Figure 6:
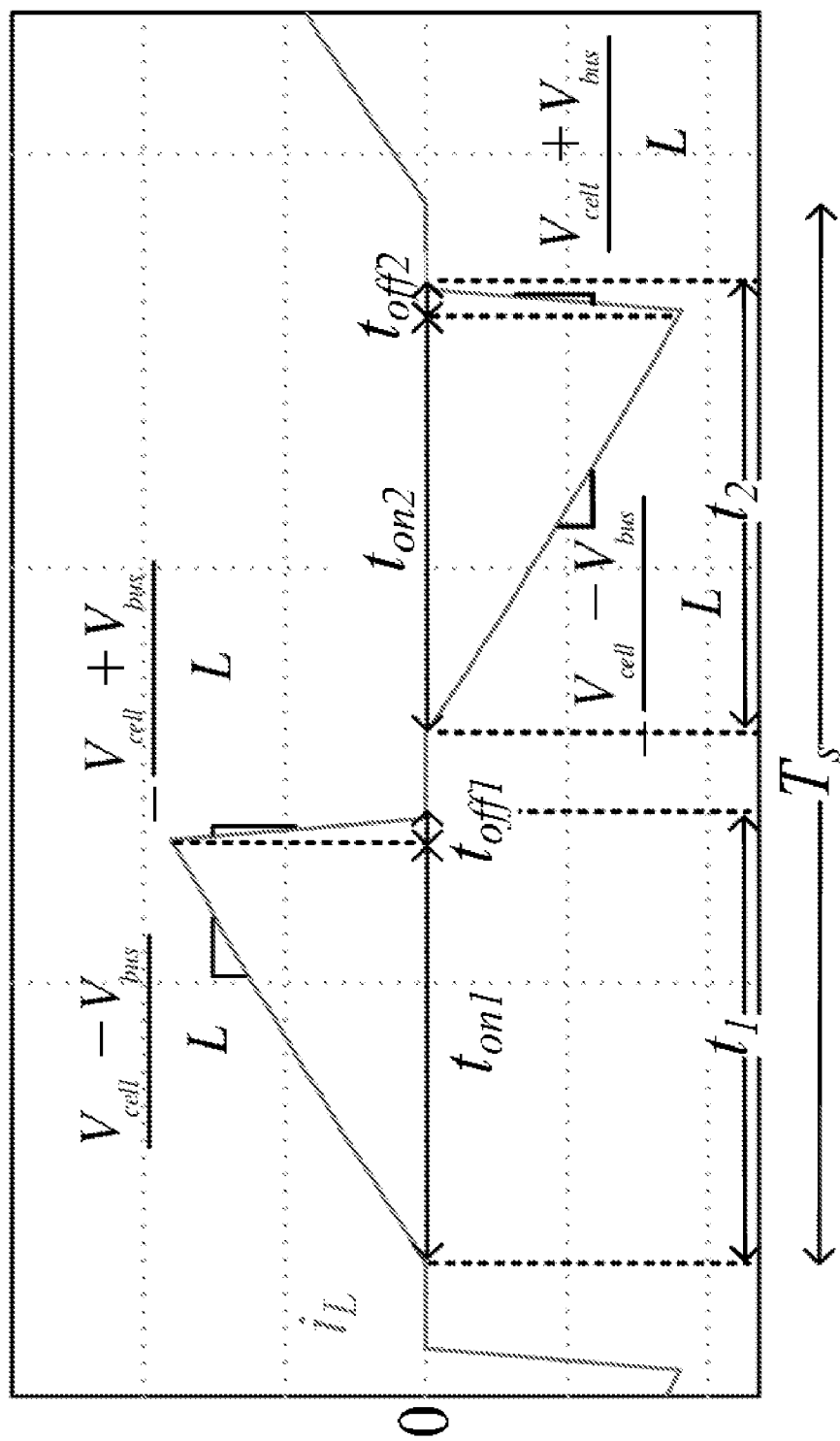
FIG. 6 shows a typical waveform of the parallel balancer current for a case that $V_{cell} > V_{bus}$ in the embodiment of FIG. 2.

FIG. 6 shows a typical waveform of the parallel balancer current for a case that $V_{cell}>V_{bus}$. As implied from formula (2) and can be observed from FIG. 6, the current slope during the on times is a function of the voltage difference between the cell and the bus. However, at the off intervals it is proportional to the sum of voltages and is much steeper than the one of the on time. This means that its effect on the total charge per cycle is small and, can be neglected for the design of the circuit.

As shown, the signal which is supplied to the primary of the transformer is created by the closure and opening of the same switches that are used in the serial balancing process. More specifically, the system of the present invention (as for example in FIG. 2) utilizes a same set of controlled switches for these two, serial and parallel balancing processes. Therefore, the number of controlled switches is significantly reduced in the hybrid-hierarchical system of the invention relative to the conventional hierarchical structure.

Figure 7:
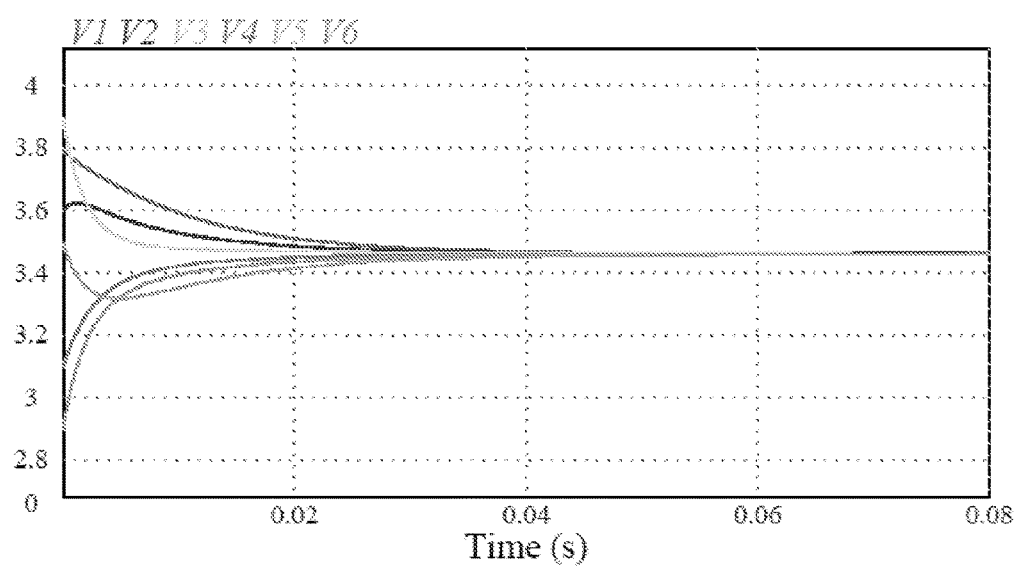
FIG. 7 shows the convergence of the balancing process as obtained in a simulation.

FIG. 7 shows the convergence of the balancing process as obtained in a simulation. A pack of six batteries (emulated by large capacitances) has been preset to different voltages. By the balancing action, their voltages converge to the average value of the pack within about 30 mS, validating the operation of the system.

Figure 3:
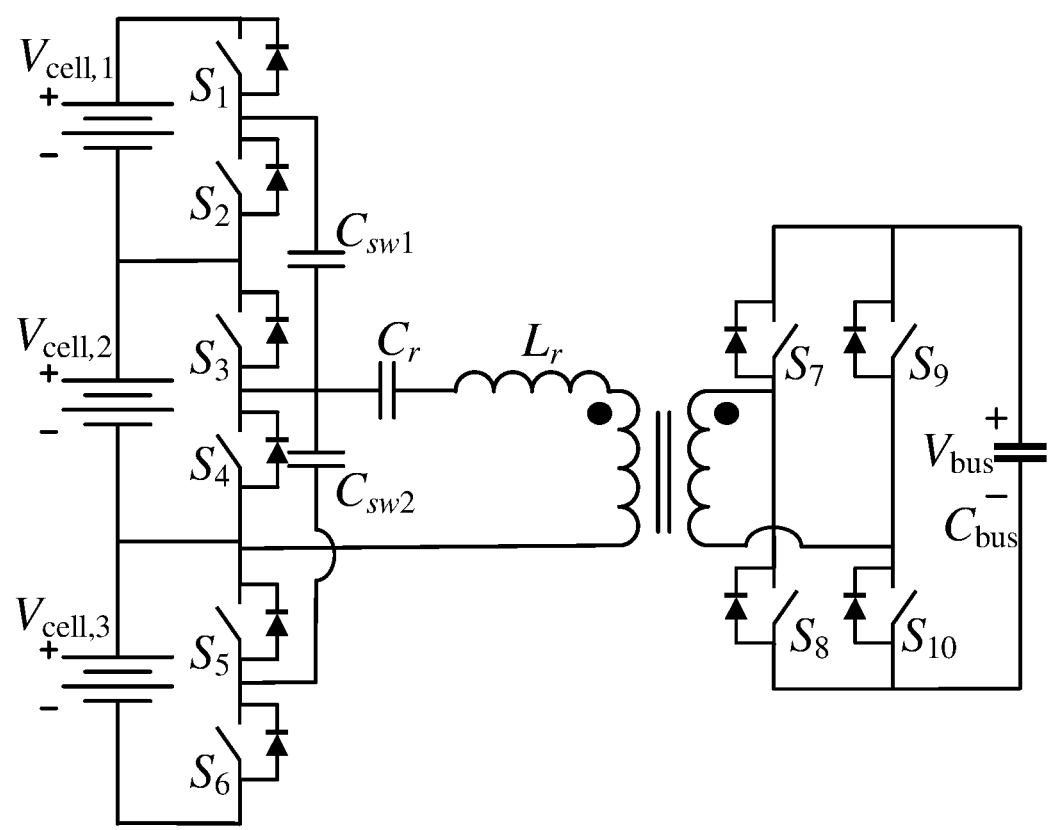
FIG. 3 illustrates an additional embodiment of the present invention, having a half-bridge rectification at the primary side.
Figure 4A:
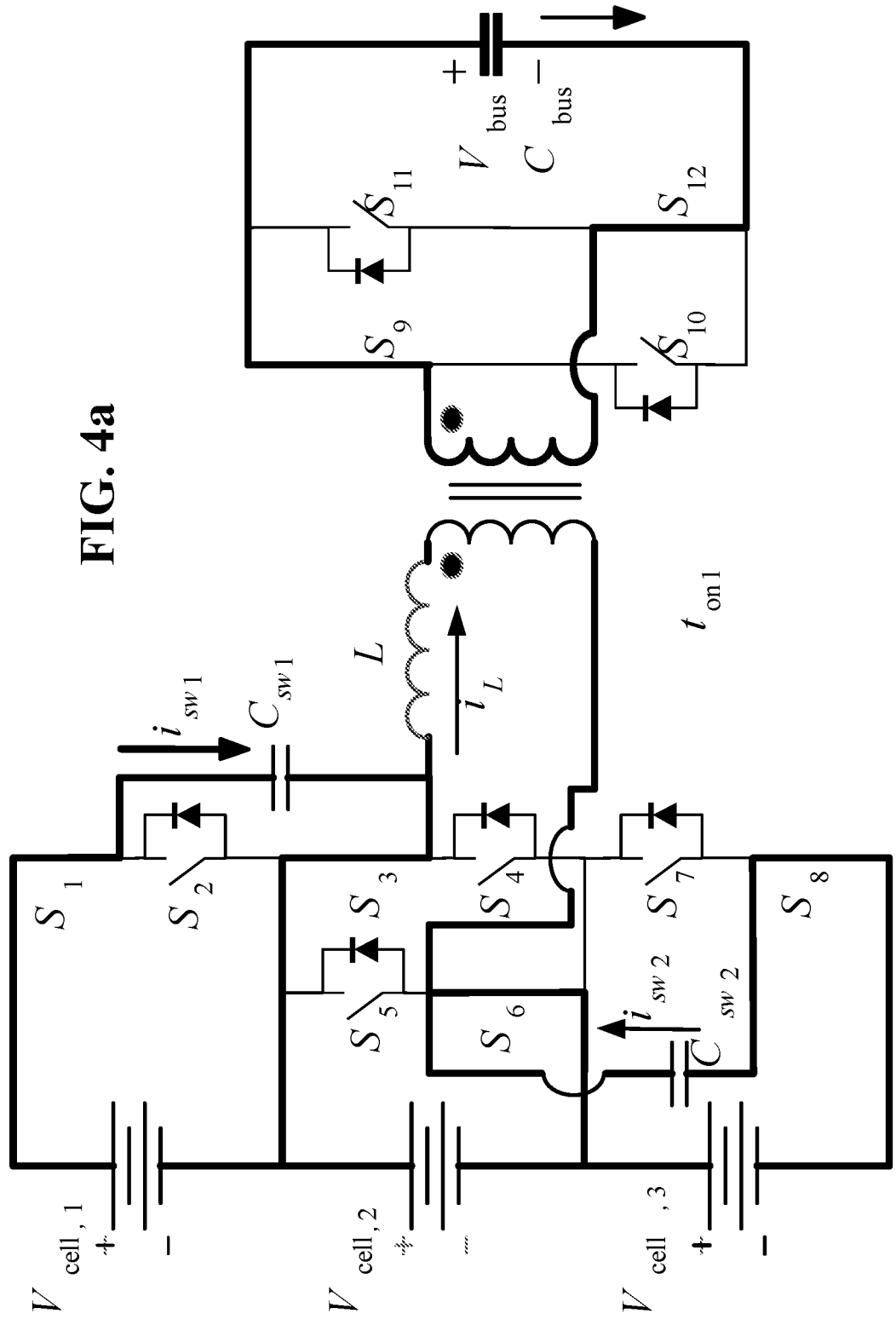
FIGS. 4(a)-4(d) illustrate various states of the balancing process of the embodiment of FIG. 2.
Figure 4B:
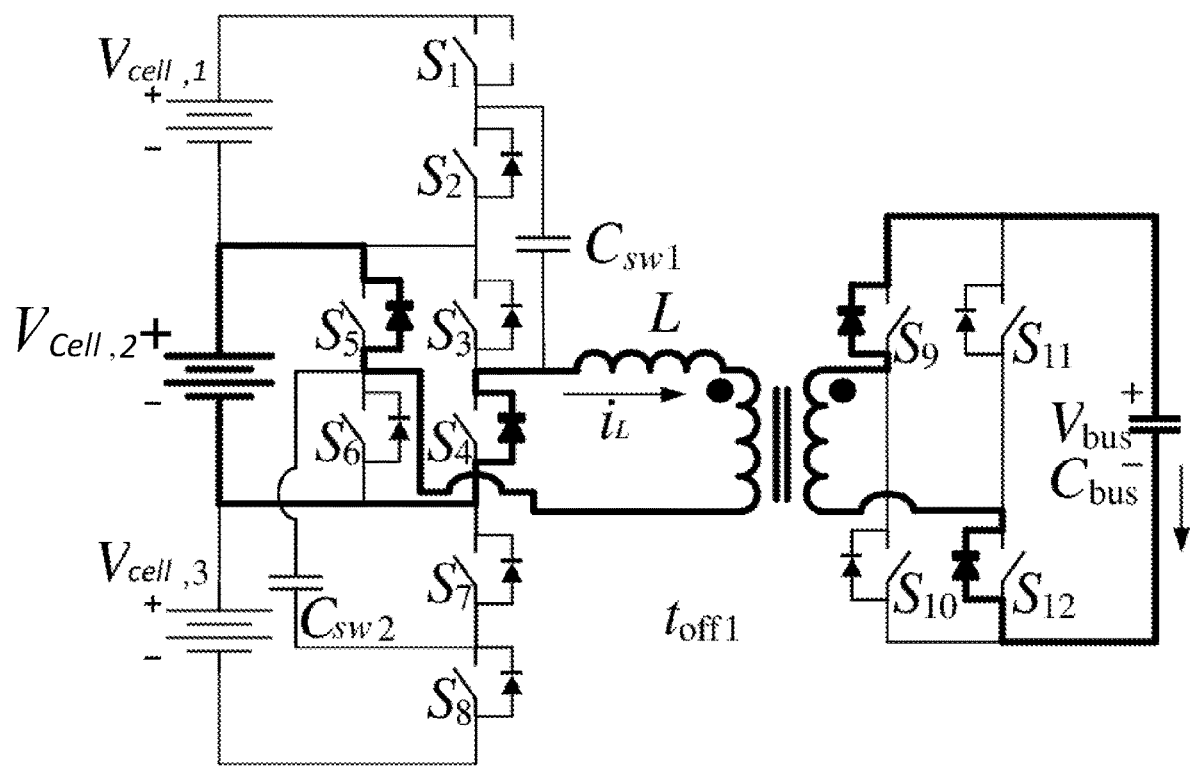
Figure 4C:
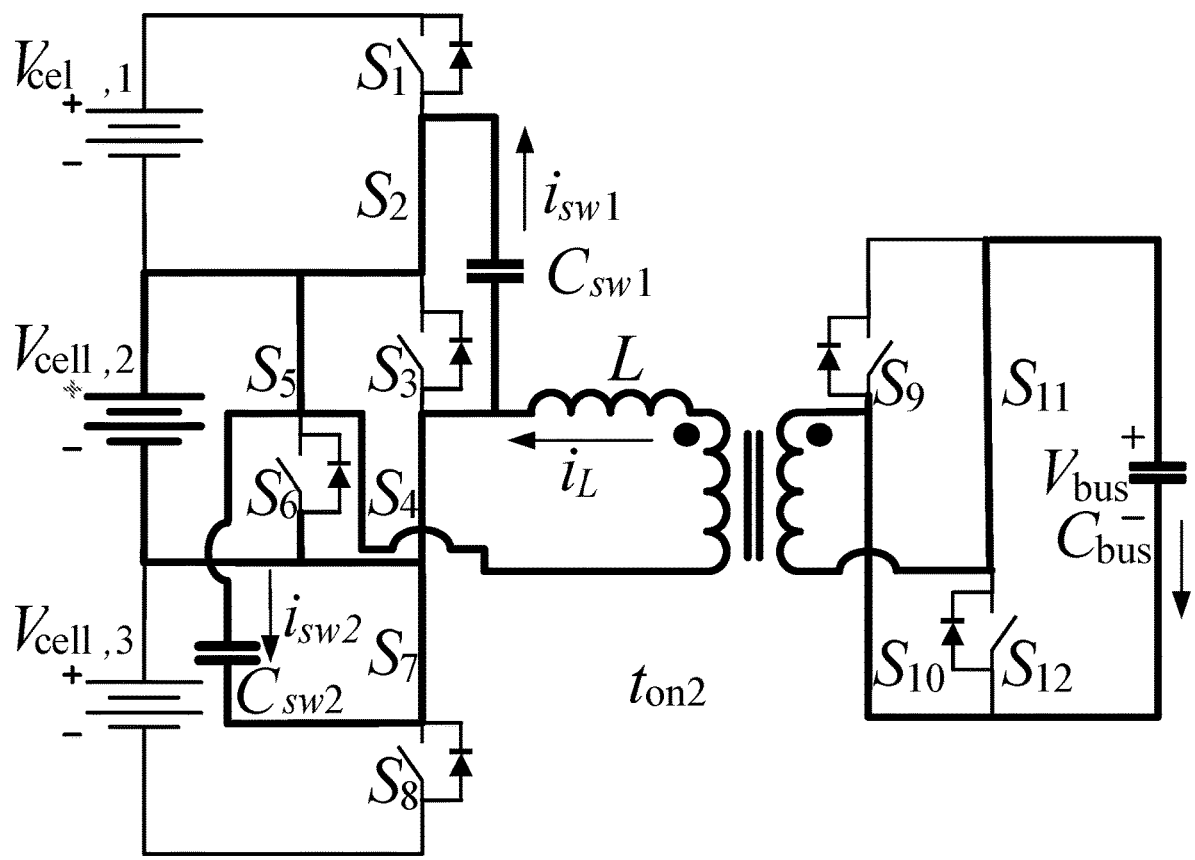
Figure 4D:
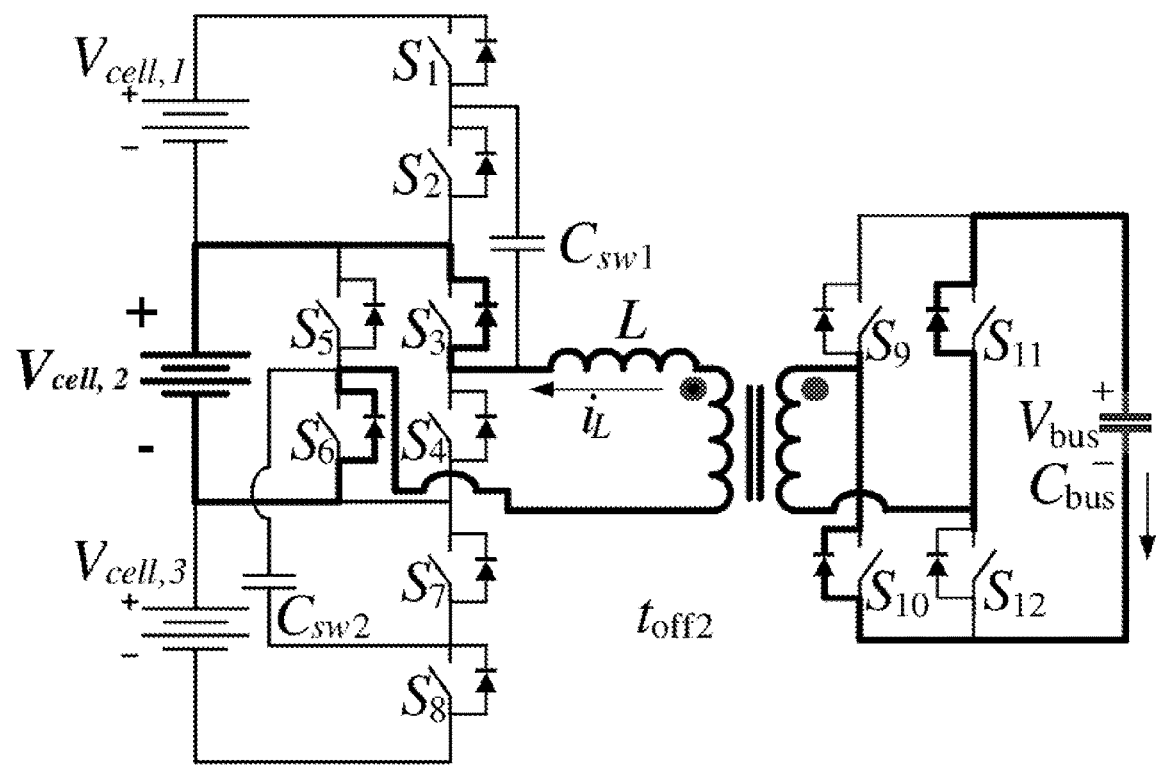

FIG. 3 shows an additional possibility (Aspect 1—resonant configuration) for facilitating the parallel link. In this case a resonant-type, half bridge configuration is used. The current that flows through the primary of the transformer is resonant and therefore ZCS—Zero Current Switching is obtained. In this system the global capacitor Cbus holds half of the average voltage of the middle cells, and can be expressed as:

$$V_{bus} = \frac{1}{2m} \sum_{k=0}^{m-1} V_{cell,3k+2} \qquad (3)$$

The switching cycle, $T_s$, is set longer than the resonant period and is divided into two equal intervals, $$t_1 = t_{on1} + t_{off1}; \text{ and}$$

$$t_2 = t_{on2} + t_{off2},$$

where $t_{on1} = t_{on2} = \pi\sqrt{L_r/C_r}$

Figure 8A:
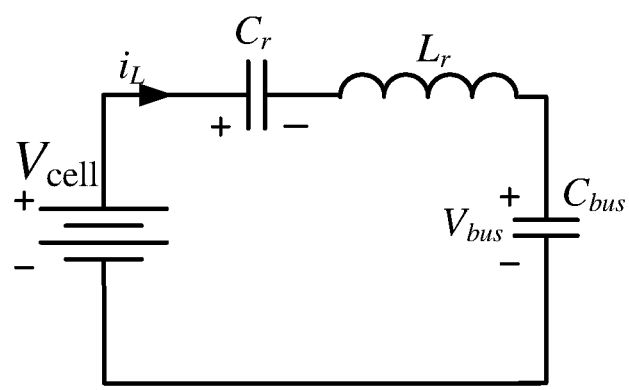
FIGS. 8(a)-8(d) show the voltage equalization mechanism for the balancing system of FIG. 3.
Figure 8B:
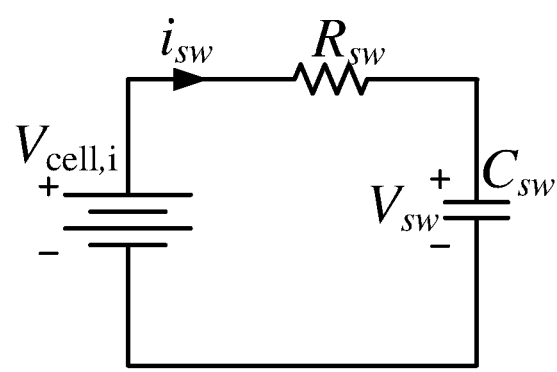

In the first half-cycle $t_1$, the switches $S_1$, $S_3$, $S_5$, $S_7$, and are turned on for ton1, allowing the current to flow in both directions. During this interval (and for the case that: $V_{cell,2}>2V_{bus}$, $V_{cell,1}>V_{cell,2}>V_{cell,3}$), the current flows from $V_{cell,1}$ to $C_{sw1}$, from $V_{cell,2}$ to $C_{sw2}$ and to the global capacitor $C_{bus}$. In the following time interval, $t_{off1}$, the switches are turned off, and no current circulates in the system. Simplified equivalent circuits for the operation of the parallel link (assuming a 1:1 ration in the transformer, although use of this ratio is not a necessity) and the SCC are depicted in FIGS. 8*a* and 8*b*, respectively.

Figure 8C:
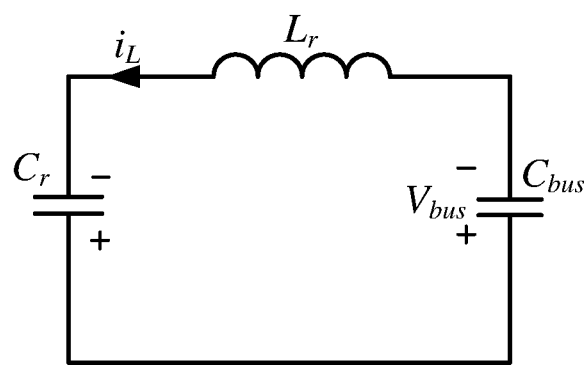
Figure 8D:
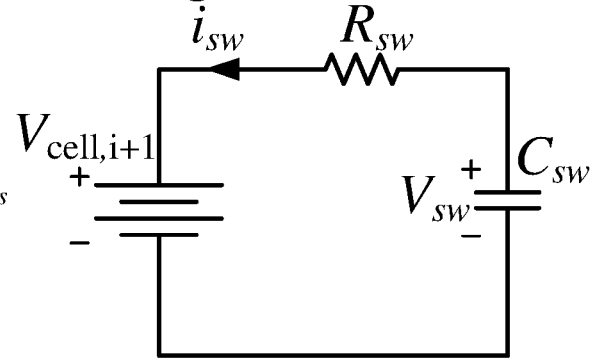

In the second half-cycle, $t_2$, switches $S_2$, $S_4$, $S_6$, $S_8$, and $S_9$, are turned on for tone so that current flows from $C_{sw1}$ to $V_{cell,2}$, from $C_{sw2}$ to $V_{cell,3}$ and a resonant current discharges the resonant capacitor $C_r$. In the next time interval, $t_{off2}$, the switches are turned off and the current is zero. The current remains zero until the next switching cycle. FIGS. 8*c* and 8*d* show the equivalent circuits during this interval. FIGS. 8(*a*)-8(*d*) show the voltage equalization mechanism for the balancing system of FIG. 3, for the case where Vcell >Vbus and Vcell,i>Vcell,i+1. FIG. 8(*a*) shows the central battery cell and the global capacitor $C_{bus}$ during t1; (b) a battery cell i and local (switched) capacitor $C_{SW}$ during t1 (the same circuit is applicable with respect to the two local capacitor and respective battery cells); (c) the central battery cell and the global capacitor during t2, (d) the battery cell i+1 and the respective switched capacitor case during t2 (again, this is applicable with respect to the two local capacitors $C_{sw}$ and respective battery cells i+1).

Figure 9:
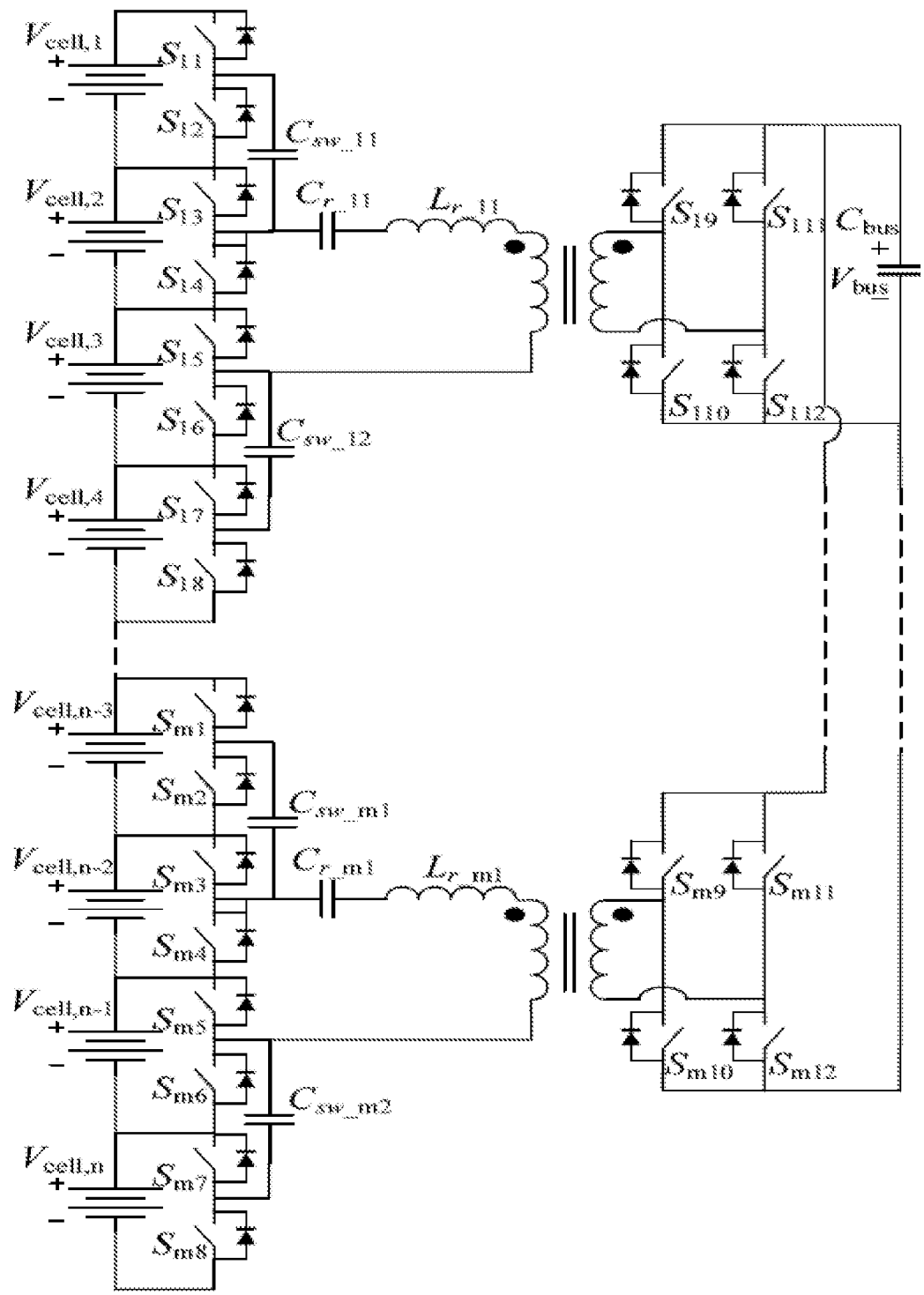
FIG. 9 shows a structure of the invention having a parallel balancing with a serial link.

According to still another aspect (aspect 2—parallel balancing with a serial link) of the present invention (shown in FIG. 9), the balancing core consists of parallel balancing for the primary energy flow and SCCs that serially link between them. This creates an additional path for the energy to flow between adjacent cells. The balancing system is divided into m modules, each comprises k=4 cells. The two inner (central) cells are connected to a parallel balancing circuit whereas the upper and lower cells use the serial link to equate their voltages with the central cells. This way, the primary energy flow of the string as well as the differential energy paths are intact.

Among the variety of options to realize a parallel balancing circuit, the present invention employs a resonant converter approach recently presented in I. Zeltser, O. Kirshenboim, N. Dahan, and M. M. Peretz, "*ZCS resonant converter based parallel balancing of serially connected batteries string,*" in Proc. IEEE Appl. Power Electron. Conf. Expo., pp. 802-809, March 2016, and demonstrated benefits of ZCS, no quiescent power loss, relatively low component count and very simple control without synchronization between modules. The parallel balancer is constructed of two cells cell,2 and cell,3, each of them is connected to a half bridge transistor assembly that connects to the primary side of the transformer via a series resonant network. The secondary side connects to the bus capacitor via a full bridge transistor assembly. In a similar manner to the configuration of FIG. 2, the global capacitor, and therefore its voltage is common for all modules and can be expressed as:

$$V_{bus} = \frac{1}{4m} \sum_{k=0}^{m-1} (V_{cell,4k+2} + V_{cell,4k+3}) \quad (4)$$

The switching frequency $f_s$ is set lower than the resonant frequency $f_r$ (i.e. $f_s < f_r$) to allow operation in DCM. By doing so, ZCS is obtained for the parallel balancing circuit. The balancing time is shared equally between the top cells and bottom ones, that is $V_{cell,1}$ and $V_{cell,2}$ are balanced for some period of time (several switching cycles, and then $V_{cell,3}$ and $V_{cell,4}$ are balanced for the same period of time in next cycles. The details of the balancing operation for one switching cycle are provided using the sub-circuits in FIGS. 9a-9d and assisted by the corresponding simplified circuits illustrated in FIGS. 10a-10d.

FIGS. 10a-10d relate to the system having 4 battery cells in each module, and for the case: $V_{bus} < 0.5 V_{cell,2}$; $0.5 V_{cell,3} < V_{bus}$; and $V_{cell,1} > V_{cell,2} > V_{cell,3} > V_{cell,4}$.

The currents flow are highlighted in FIGS. 10a-10d. $i_{sw}$ represents the current that flows in the series path ($i_{sw1}$ via the capacitor $C_{sw1}$ and $i_{sw2}$ via the capacitor $C_{sw2}$). The resonant current $i_L$ indicates the current that flows through the primary side of the transformer.

Figure 10:
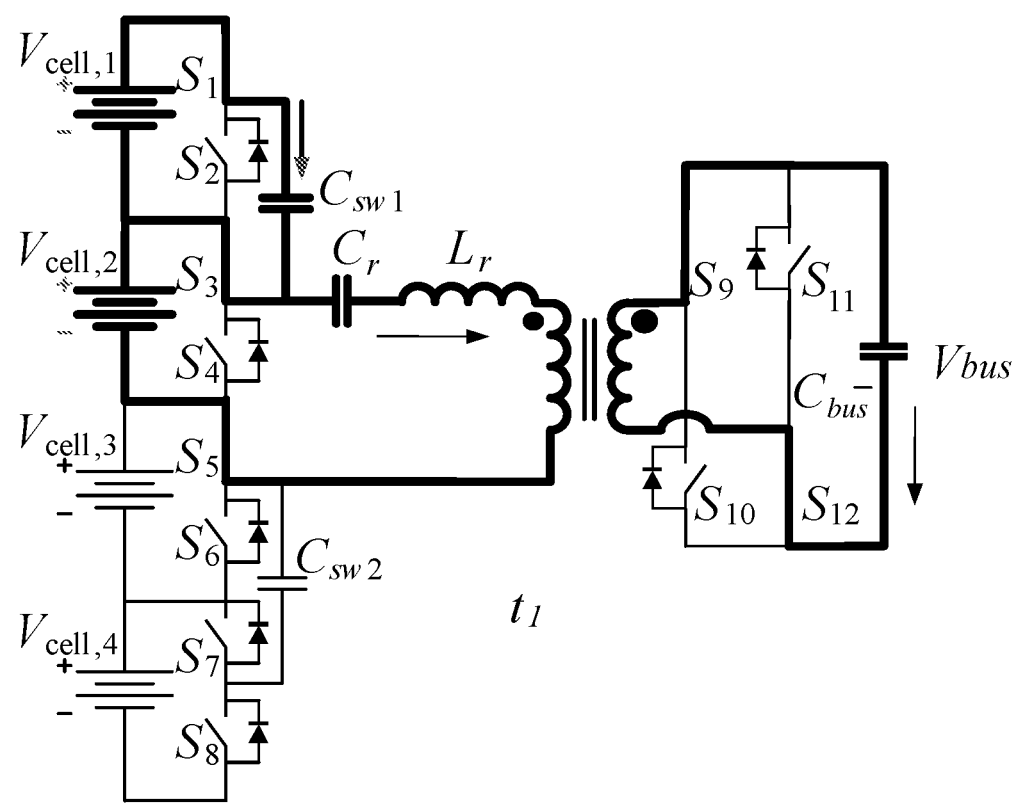
FIGS. 10(a)-10(d) show the voltage equalization mechanism for the balancing system of FIG. 9.
Figure 10B:
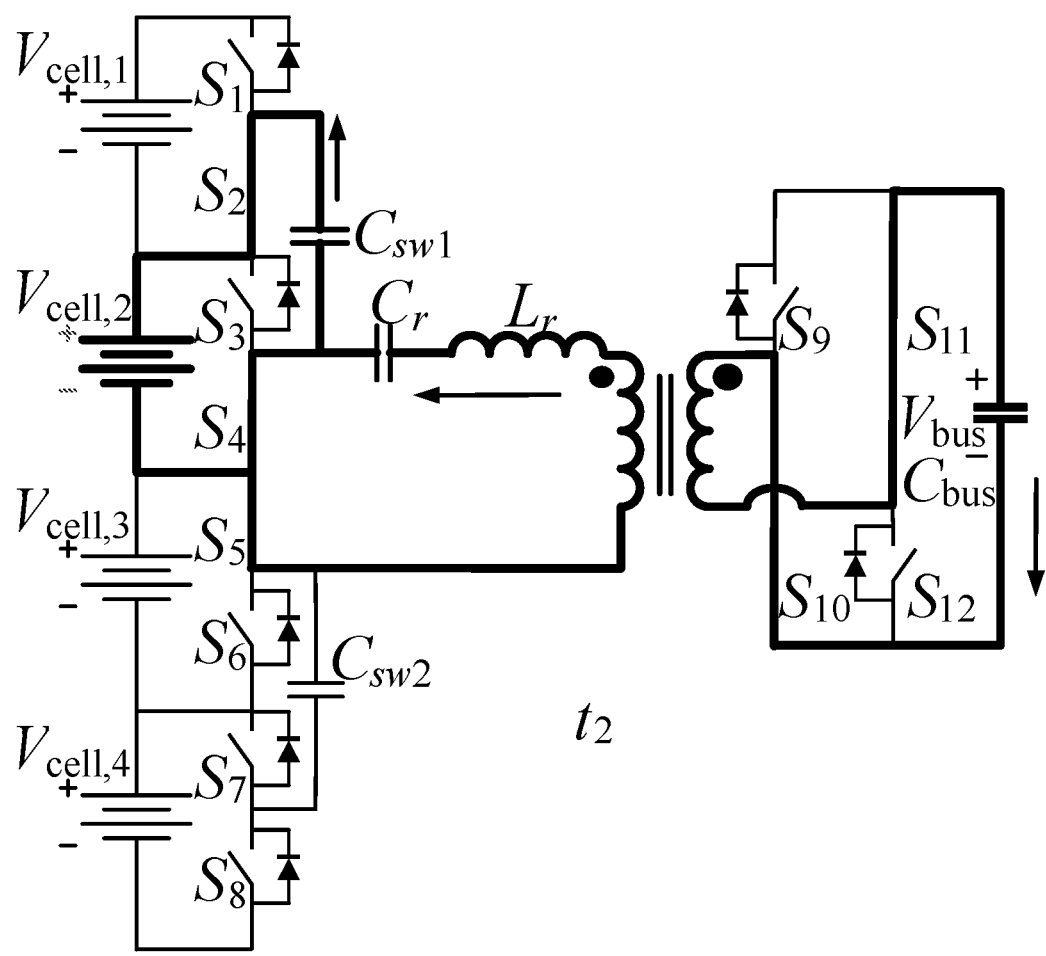
Figure 10C:
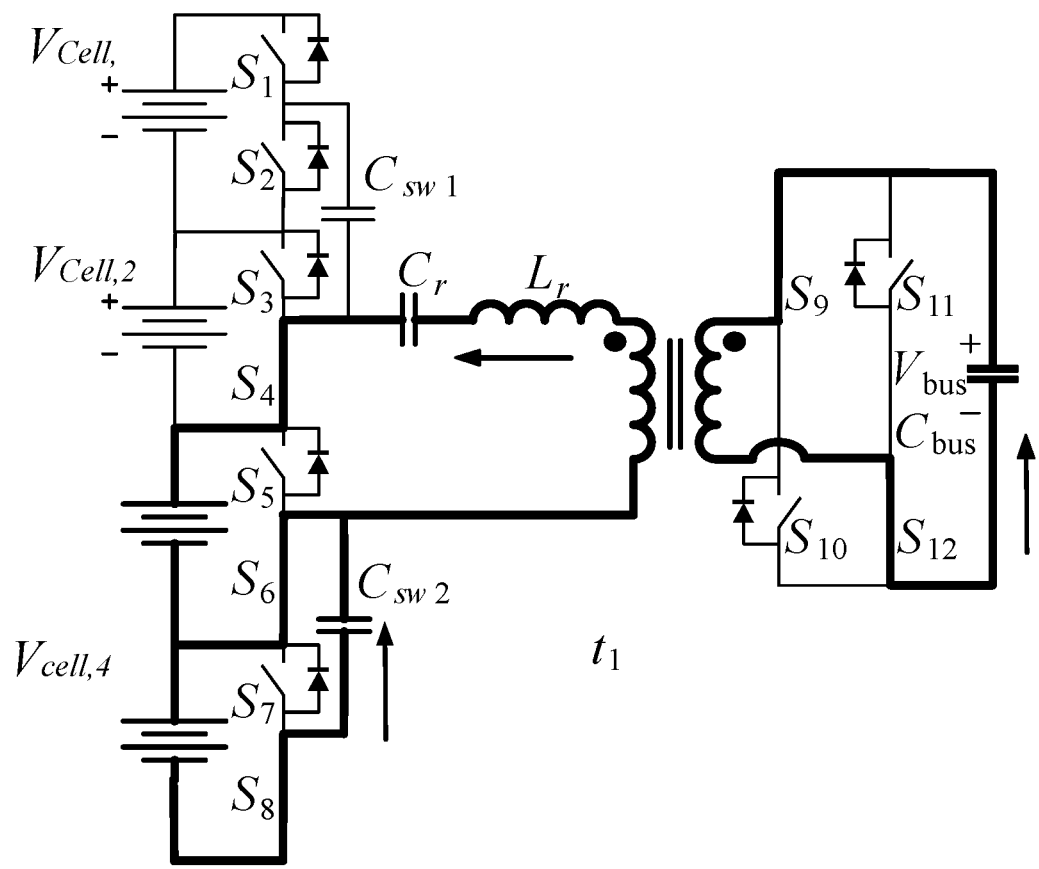
Figure 10:
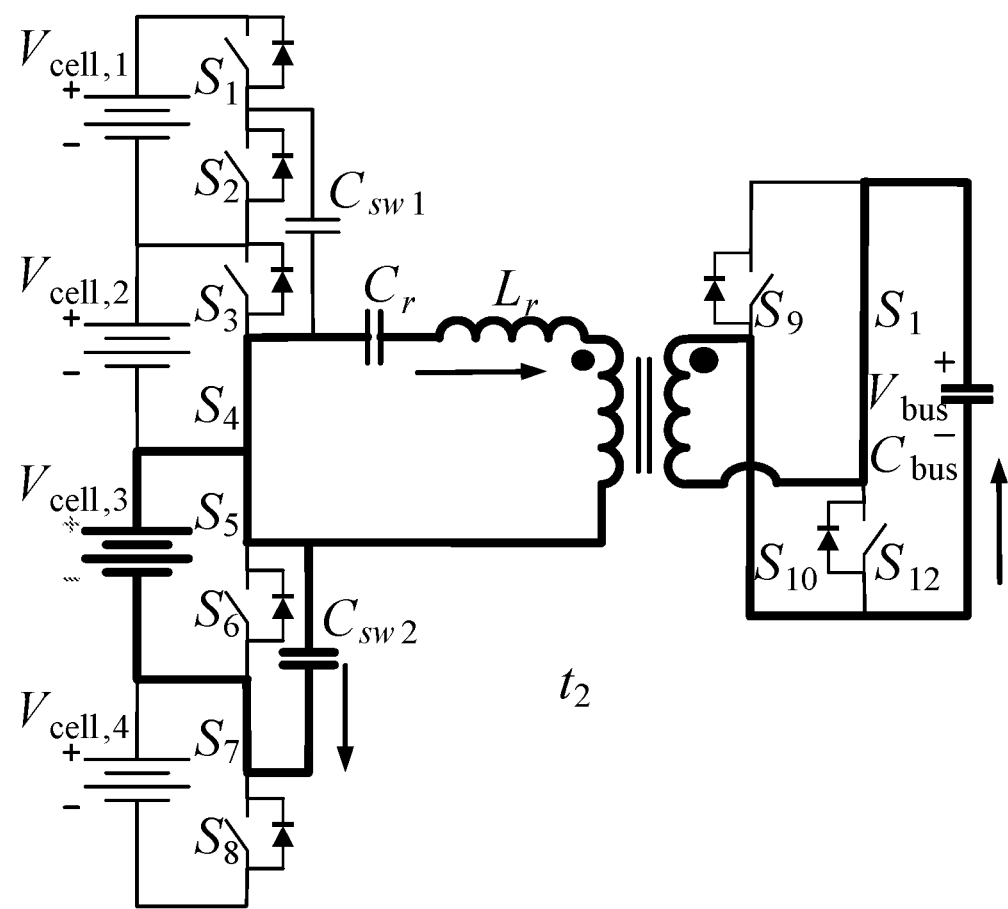
Figure 11A:
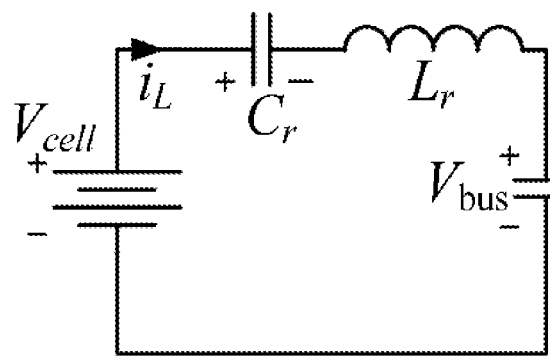
FIGS. 11(a)-11(d) are simplified circuits of the states shown in FIGS. 10(a)-10(d)
Figure 11B:
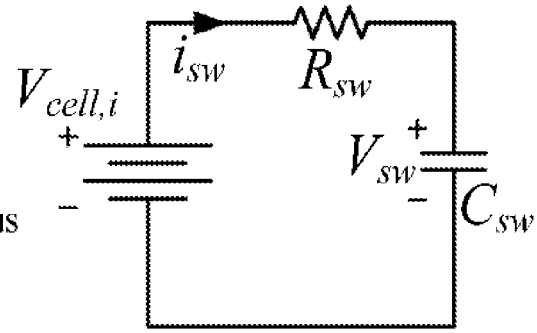
Figure 11C:
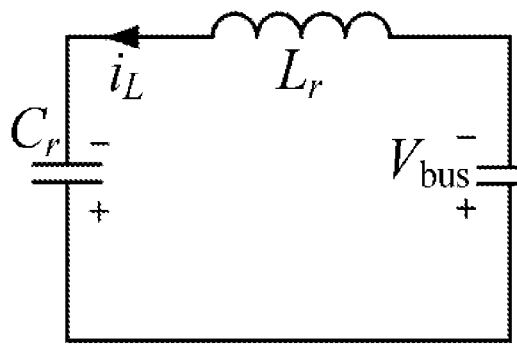
Figure 11D:
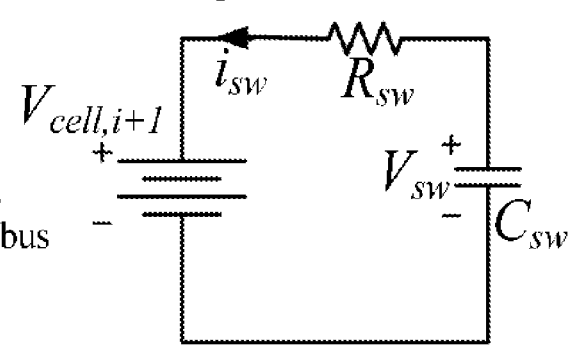

The switching cycle is divided into four intervals, $t_1$ and $t_2$, for the top cells (described in FIG. 10(a) and FIG. 10(b)), and $t_3, t_4$ (described in FIG. 10(c) and FIG. 10(d)) for the bottom cells of each module.

In the first interval $t_1$ (see FIG. 10a), switches $S_1$, $S_3$, $S_9$, and $S_{12}$ are turned on, allowing bi-directional current flow. During this interval, (a) current flows from $V_{cell,1}$ to $C_{sw1}$ to charge $C_{sw1}$ to the voltage of $V_{cell,1}$. Simultaneously, the global (bus) capacitor $C_{bus}$ is charged by a balancing signal which is proportional to $V_{cell,2}$, and $C_{bus}$ is also charged in parallel by respective signals that are created in all the other modules (these signals charge or discharge $C_{bus}$, depending on where is the higher voltage among the two cells/capacitor involved).

In the second interval $t_2$ (see FIG. 9b), switches $S_2$, $S_4$, $S_5$, $S_{10}$, and $S_{11}$ are turned on, again allowing a bi-directional current flow. During $t_2$ $V_{cell,2}$ is connected in parallel to $C_{SW,1}$, therefore it is now balanced against the voltage of Cell,1 (as the voltage level over $C_{SW,1}$ reflects the voltage level as previously taken from Cell,1). In the third interval $t_3$ (see FIG. 9c), $S_4$, $S_6$, $S_8$, $S_9$, and $S_{12}$ are turned on such that: capacitor $C_{SW2}$ is in parallel to cell,4 such that it is charged to the voltage level of Cell,4, while simultaneously the bottom-central cell Cell,3 is balanced against capacitor $C_{bus}$. In the fourth interval $t_4$ $S_4$, $S_5$, $S_7$, $S_{10}$, and $S_{11}$ are closed, therefore Cell,3 becomes parallel with $C_{SW2}$, therefore Cell,3 is in fact balanced against Cell,4 (as the voltage level of $C_{SW2}$ was previously equated to the voltage level of Cell,4).

FIGS. 11(a)-11(d) illustrate the Voltage equalizing mechanism for the case $V_{cell} > V_{bus}$ and $V_{cell,i} > V_{cell,i}$: (a) battery cell and the bus capacitor during $t_1$, (b) battery cell and switched (global) capacitor case during $t_1$, (c) battery cell and the bus (global) capacitor during $t_2$, (d) battery cell and switched (local) capacitor case during $t_2$.

Figure 12:
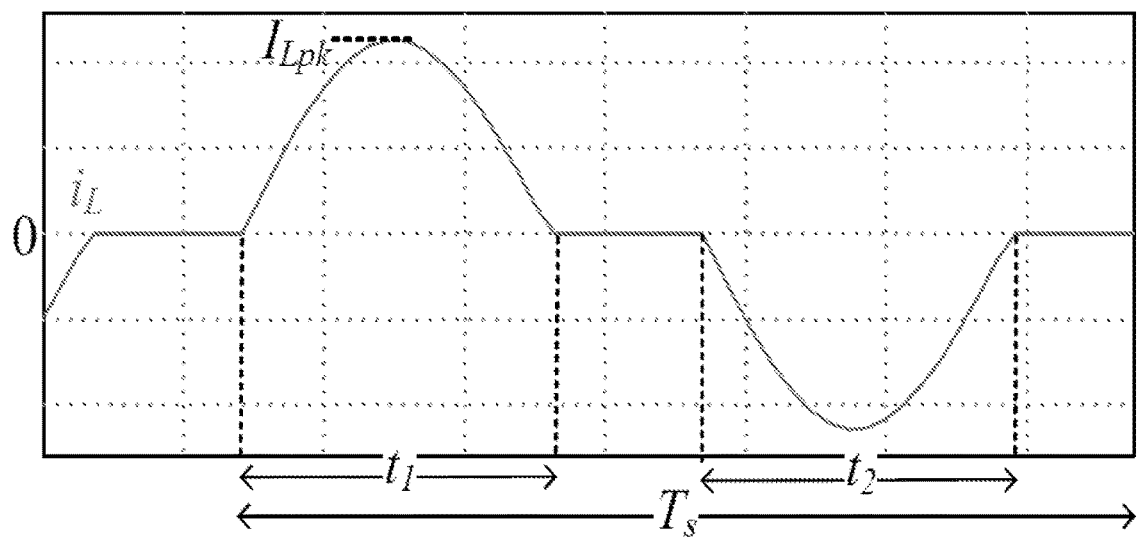
FIG. 12 shows the balancing current for the parallel balancing circuit for one switching period.

The balancing current for the parallel circuit for one switching period is depicted in FIG. 12. It is a function of the voltage difference between the cell and the bus capacitor, and can be expressed as:

$$i_L(t) = \frac{\Delta V}{\left(i - e^{-\frac{\pi}{4Q}}\right) Z_r} e^{-\frac{2\pi f_r}{2Q} t} \sin(2\pi f_r t) \quad (5)$$

where, $$Z_r = \sqrt{L_r / C_r}$$

is the characteristic impedance of the resonant tank; $\Delta V = 0.5 V_{cell} - V_{bus}$ is the voltage applied on the resonant network, Q is the quality factor of the resonant tank, and $f_r$ is the resonant frequency, given by:

$$f_r = \frac{1}{2\pi \sqrt{L_r C_r}} \quad (6)$$

Figure 13:
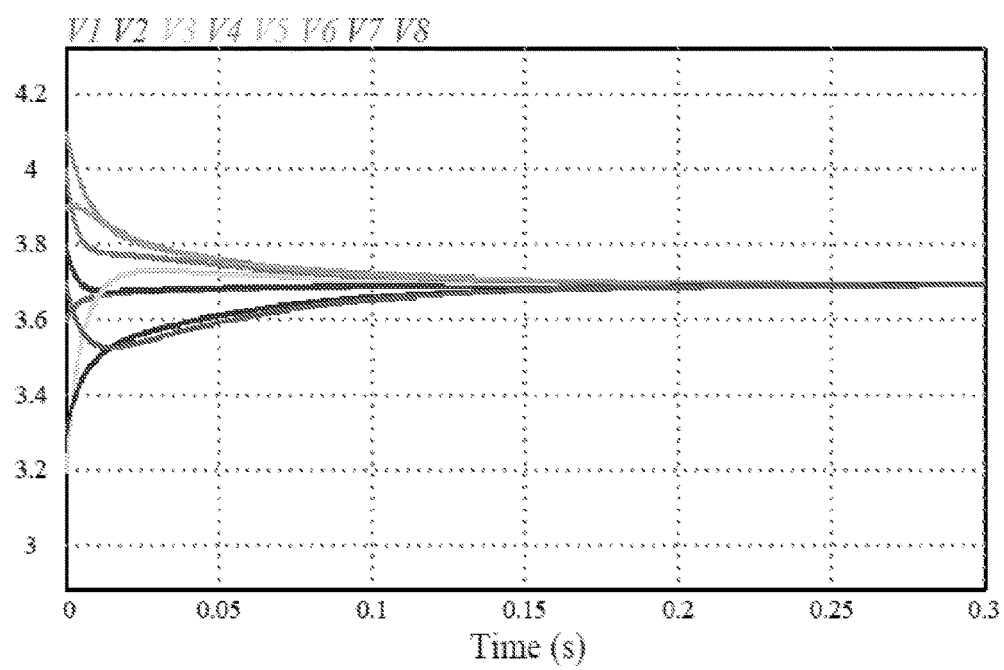
FIG. 13 shows convergence results of the balancing structure as obtained in a simulation.

FIG. 13 shows convergence results of the balancing structure as obtained through simulation. A pack of eight batteries (emulated by large capacitances) has been preset to different voltages, by the balancing action their voltages converge to the average value of the pack, validating the operation of the system. As FIG. 13 shows, at the initial state, battery 1 was at 4.1V, battery 2 was at 3.8V, battery 3 was at 3.2V, battery 4 was at 4.0V, battery 5 was at 3.3, battery 6 was at 3.9V, battery 7 was at 3.7V, and battery 8 was at 3.6V. A convergence was obtained after less than 200 ms.

Experiment

TABLE I

EXPERIMENTAL PROTOTYPE VALUES

| Component | Value |
|---|---|
| Batteries (emulated by large capacitors) | 45 mF |
| Transformer leakage inductances $L_1$, $L_2$ | 2 µH |
| Transformer magnetizing inductances $L_{m1}$, $L_{m2}$ | 2.5 mH |
| SCC capacitors | 10 µF |
| MOSFETs $S_{m1}$-$S_{m12}$ | 30 V, 5.7 mΩ |
| Bus capacitor $C_{bus}$ | 15 mF |
| Switching frequency $f_s$ | 200 kHz |

TABLE II

EXPERIMENTAL PROTOTYPE VALUES - RESONANT LINK

| Component | Value |
|---|---|
| Resonant inductances $L_{r1}$, $L_{r2}$ | 45 mF |
| Resonant capacitance $C_{r1}$, $C_{r2}$ | 150 nF |
| Resonant frequency $f_r$ | 220 kHz |

Figure 14:
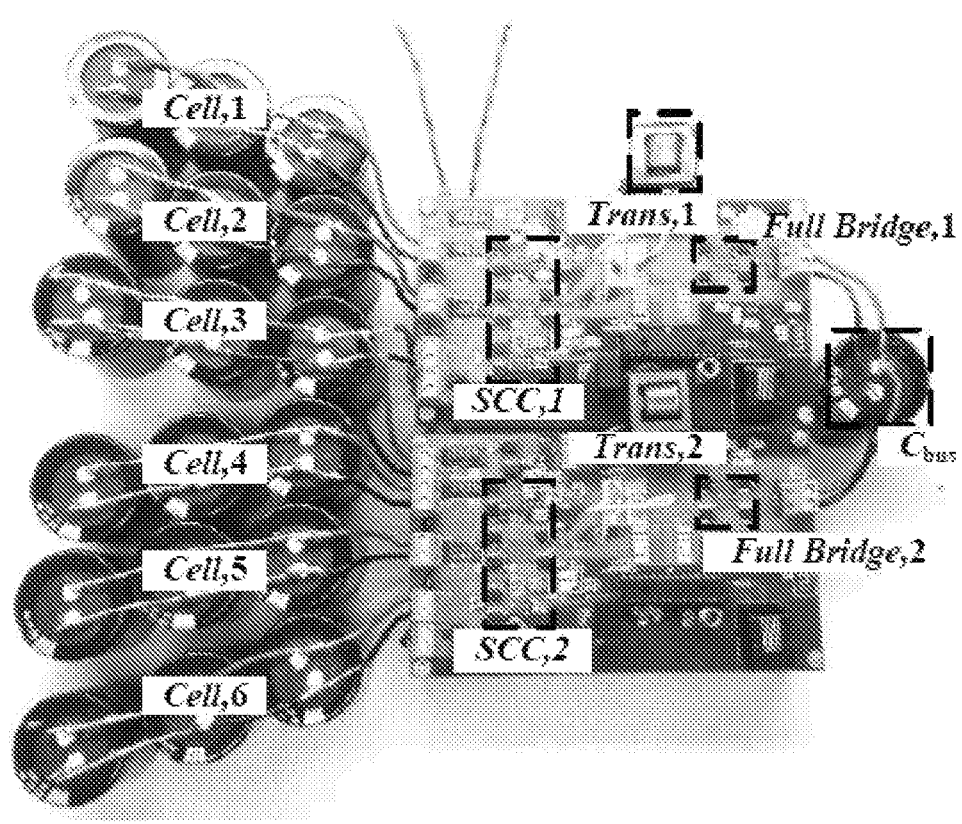
FIG. 14 shows a hardware prototype as used in a simulation.

To demonstrate the balancing operation and verify the theoretical analysis and simulation results, several experiments have been carried out using two modules of the series balancing system with parallel links as described in FIGS. 2 and 3. Each module consists of three battery cells and all six-battery cells are connected in series. Table I shows the components types and values of the experimental setup described in FIG. 2. Table II summarizes the experimental parameters for the prototype described in FIG. 2. The hardware prototype is shown in FIG. 14.

The experiments have proven the applicability of the circuits of the invention. The voltages of all six cells that have been used converge to their average value. Furthermore, once balance has been obtained, the current decayed to zero since, upon balancing, the voltage difference between all cells were zero. Convergence to voltage difference of 300 mV took 240 ms, where with the hybrid configurations, the duration has been trimmed down by 37.5% to 150 ms and by 12.5% to 210 ms.

According to a third aspect of the present invention, the balancing system comprises a non-isolated parallel batteries balancing topology with a simple sensorless implementation and reduced component count that reduces the complexity of the balancing solution.

Figure 15:
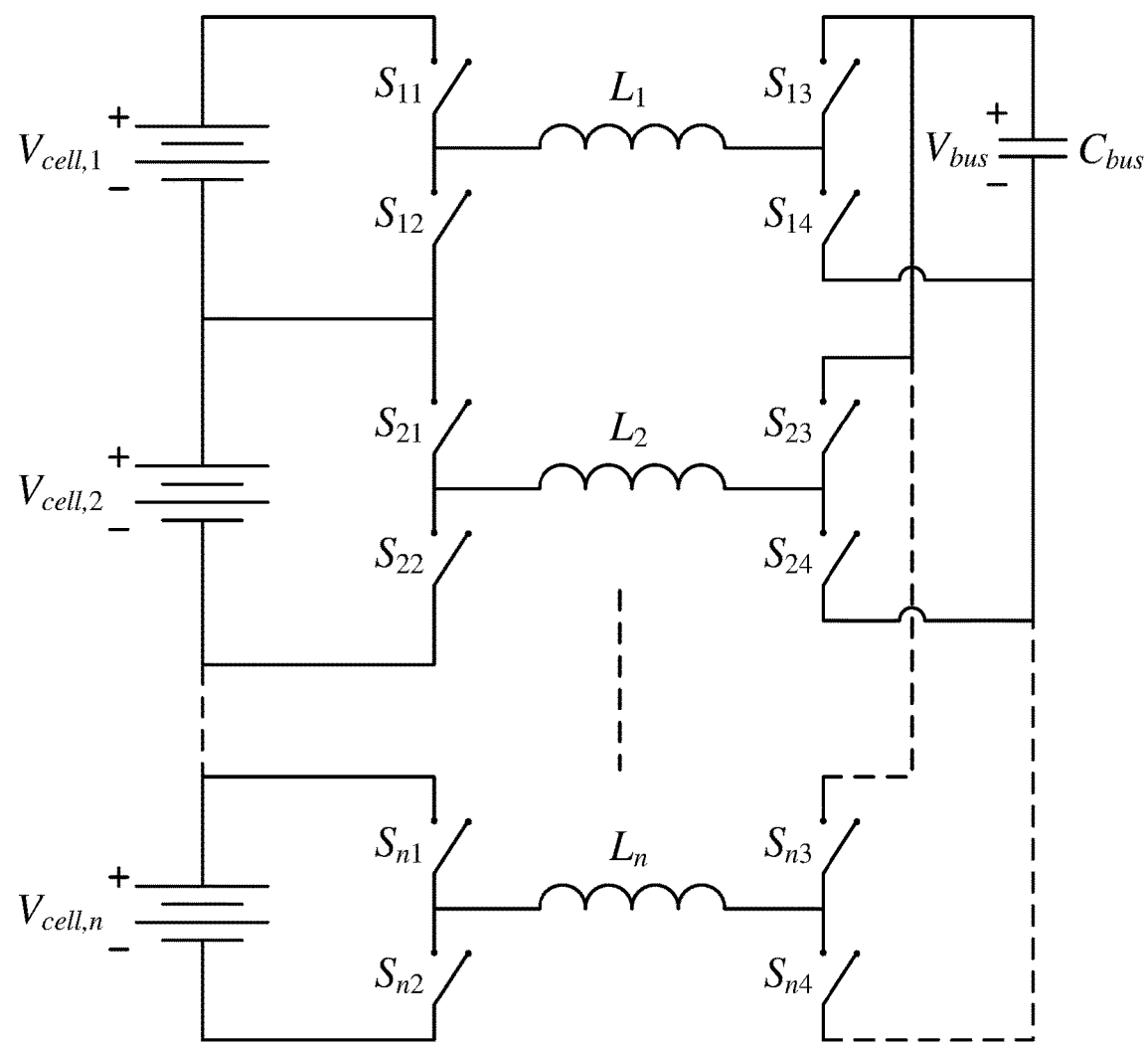
FIG. 15 shows still another embodiment of the invention which operates without an isolation transformer.

FIG. 15 shows an embodiment of the present invention comprising a string of a plurality of cells connected in series. Balancing of the string is achieved through voltage equalization of all cells. As before, the system comprises a topology that equalizes the voltage of each of the cells to their average voltage using a common global (bus) capacitor $C_{bus}$. The overall volume and complexity of the system is small, since neither transformers nor sensors are required. This is facilitated by utilizing conduction paths of a neighboring module to link with the energy buffer $C_{bus}$. The converter operates in DCM and the current that flows between the cells and the bus is a function of their voltage difference. As a result, the quiescent power loss is minimal since no energy circulates in the system when the cells are balanced (this is in similarity to the previous embodiments).

The operation of the balancing system of FIG. 15 is based on voltage equalization between the batteries and the bus capacitor $C_{bus}$. By connecting a cell to the bus capacitor through an inductor, as shown in a simplified manner in FIGS. 16(a)-16(d), the inductor current direction is governed by the polarity of the voltage difference and the current naturally flows toward to the source with the lower voltage and charges it.

In the system of FIG. 15, the bus capacitor is common for all the n battery cells using n balancing modules, each module comprises a battery cell, 4 switches and an inductor. The modules are bidirectional converters that operate sequentially, for example, every switching cycle a different module (or a different current flow relating to that module) is active. This procedure is repeated for all the battery cells. Assuming similar cells, this results in a bus capacitor voltage that converges to the average of the cells' voltages, given by:

$$V_{bus} = \frac{1}{n}\sum_{m=1}^{n} V_{cell,m} \quad (7)$$

where $V_{bus}$ is the bus capacitor voltage and n is the number of cells in the string. Since the bus (global) capacitor is common for the entire string, the respective voltages of all the cells eventually balanced and their voltages converge to (7).

The circuit of this embodiment uses the adjacent balancing module for a return conduction path for the current when balancing a certain cell takes place. As a result, fewer switches are required and the inductor per module is of lower volume. For example, as can be seen in FIG. 16, when balancing $V_{cell,1}$, the inductor $L_2$ of the adjacent module is used in the return path of the current. The system operation is set to DCM, so that the inductors' current at the beginning of the switching cycle is zero. This guarantees that there is no current imbalance between the inductors. The direction of the current flow is governed by the voltage difference between $V_{bus}$ and $V_{cell}$, eliminating the need for current sensing. In the case that the voltages are equal, no current circulates through the circuit.

The balancing method of the system showing two adjacent modules (with two adjacent battery cells) is shown in FIGS. 16a-16d. The system comprises cells Cell,1, and Cell,2 connected in series having a voltage of $V_{cell,1}$ and $V_{cell,2}$ respectively, wherein Cell,1 is connected to Cell,2. During the first balancing period of the cell (FIG. 16a or FIG. 16c), the adjacent module (with $V_{cell,2}$) switches $S_{21}$ and $S_{24}$ are turned on to create a return path for the current. In the first step, switches $S_{11}$ and $S_{13}$ are on and the current in the inductors $L_1$ and $L_2$ ramp up or down, determined by the voltage difference polarity of $\Delta V = V_{cell,1} - V_{bus}$. In the case when:
$V_{cell,1} > V_{bus}$ (FIG. 16a) the energy is transferred from $V_{cell,1}$ to the bus capacitor $V_{bus}$, and in the case when:
$V_{cell,1} < V_{bus}$ (FIG. 16c) the energy is transferred in the opposite direction.

In the second step (FIG. 16b or FIG. 16d), after the predefined on time that ensures operation in DCM, and regardless of the current direction, switches $S_{11}$ and $S_{13}$ are turned off. At this point, due to continuity of the inductors current, either the body diodes of switches $S_{12}$ and $S_{13}$ (for case of FIG. 16b) or $S_{11}$ and $S_{14}$ (for case of FIG. 16d) are forward biased for the case $V_{cell,1} > V_{bus}$ (FIG. 16b) or $V_{cell,1} < V_{bus}$ (FIG. 162d), respectively. The applied voltage on the inductors when the body diodes conduct is the minimum between $V_{cell,1}$ and $V_{bus}$, ramping down the current back to zero. The current remains zero until the start of the next switching cycle.

Figure 17:
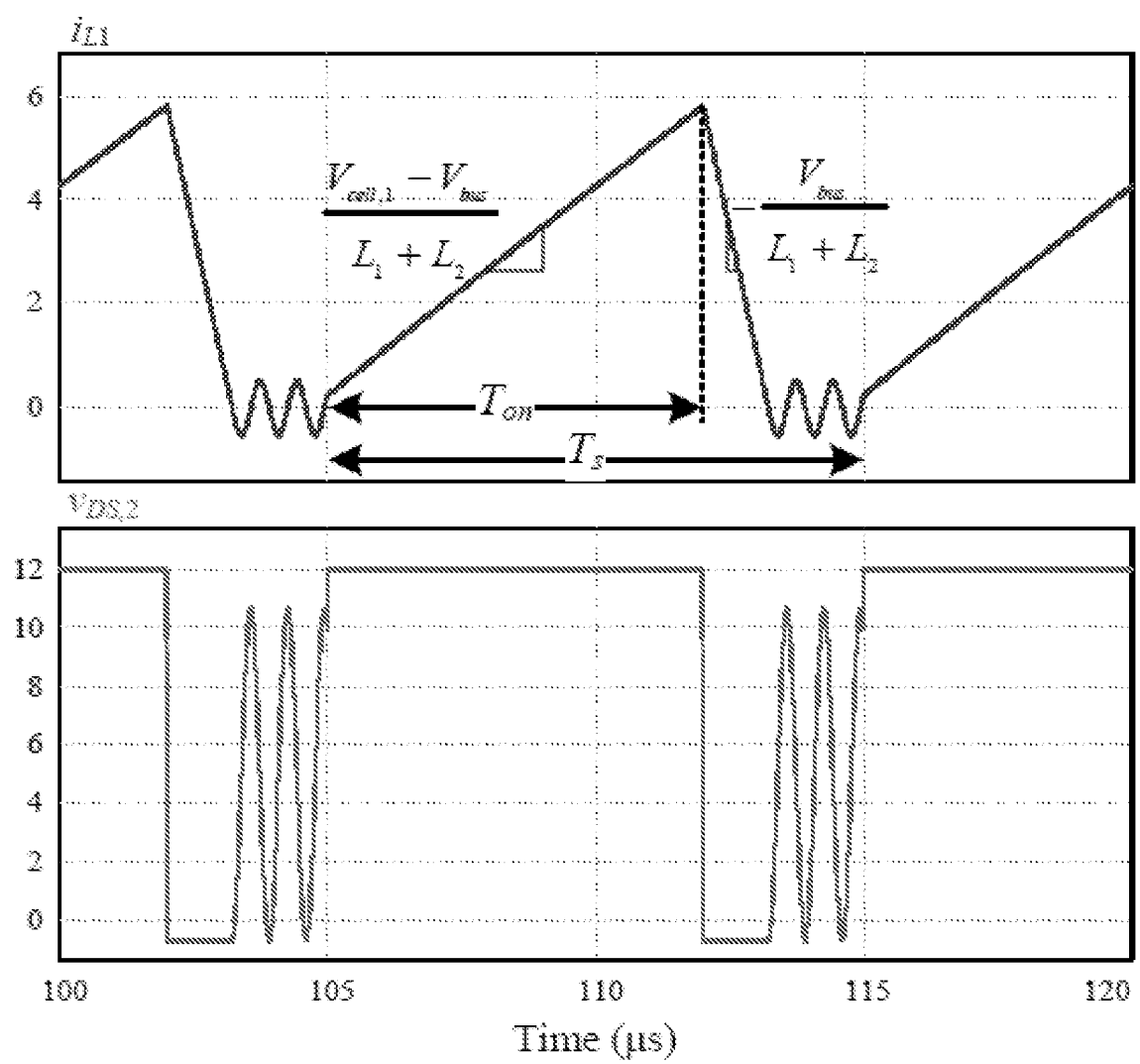
FIG. 17 shows the current $I_L$ (top) and voltage (bottom) waveforms for the case that $V_{cell,1} > V_{bus}$ in the embodiment of FIG. 16.

FIG. 17 shows the current $I_L$ (top) and voltage (bottom) waveforms for the case that $V_{cell,1} > V_{bus}$. During the on time, the inductors current ramps up with a slew rate of:

$$\frac{di_L}{dt} = \frac{V_{cell,1} - V_{bus}}{L_1 + L_2} \quad (8)$$

During the off time, the applied voltage on the inductors is the minimum between the two voltages, and therefore the inductors current ramps down with a slew rate of:

$$\frac{di_L}{dt} = \frac{\min(V_{cell,1}, V_{bus})}{L_1 + L_2} \quad (9)$$

The body diodes stop conducting at the point where the current is zero. Neglecting the parasitic oscillations that are common for any DCM operation, the current remains zero until the next switching cycle.

The balancing of the adjacent cell no. 2 ($V_{cell,2}$) is performed in a similar manner to the balancing operation of cell no. 1 As described above.

Figure 18:
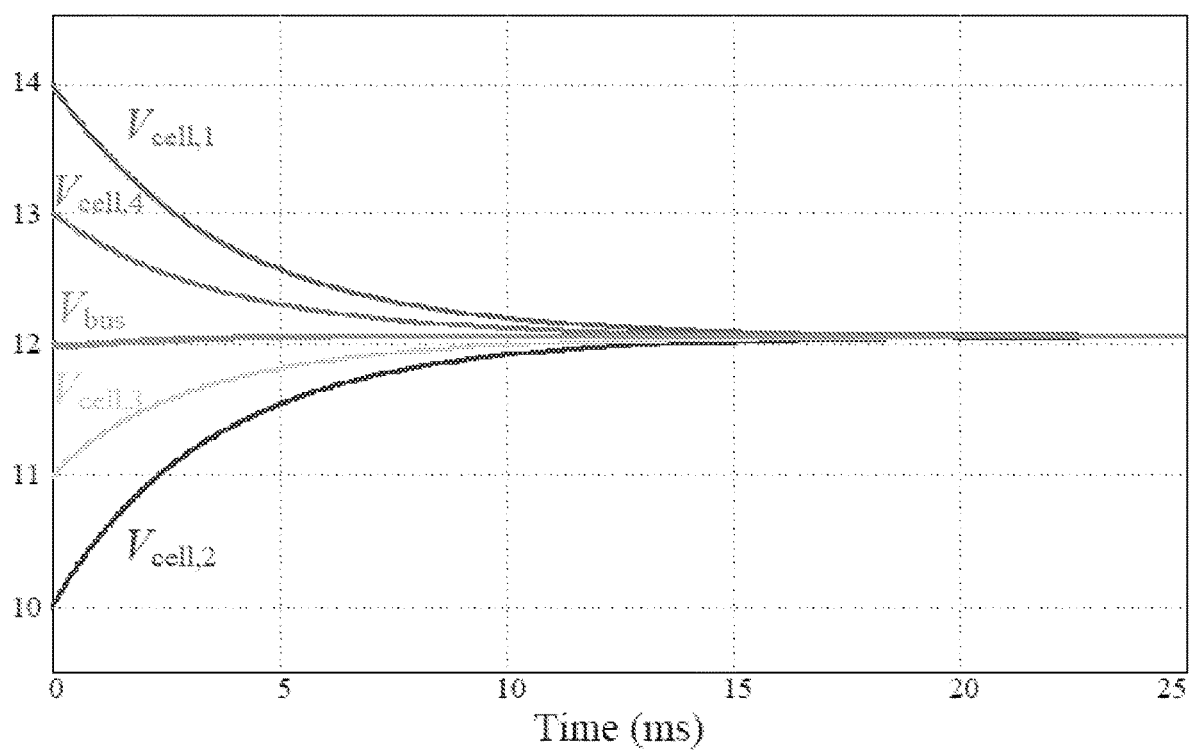
FIG. 18 depicts the convergence of four cells (emulated by large capacitances), as obtained in a simulation for the embodiment of FIG. 17.

To demonstrate the balancing operation of the system, a simulation case experiment has been carried out and the results are shown in FIG. 18. It depicts the convergence of four cells (emulated by large capacitances), each set with different initial voltages, to the cells' average voltage, validating the balancing capability of the system. The top curve refers to $V_{cell,1}$, the next one to $V_{cell,4}$, then $V_{bus}$, $V_{cell,3}$, and finally $V_{cell,2}$ (the bottom curve).

Figure 19:
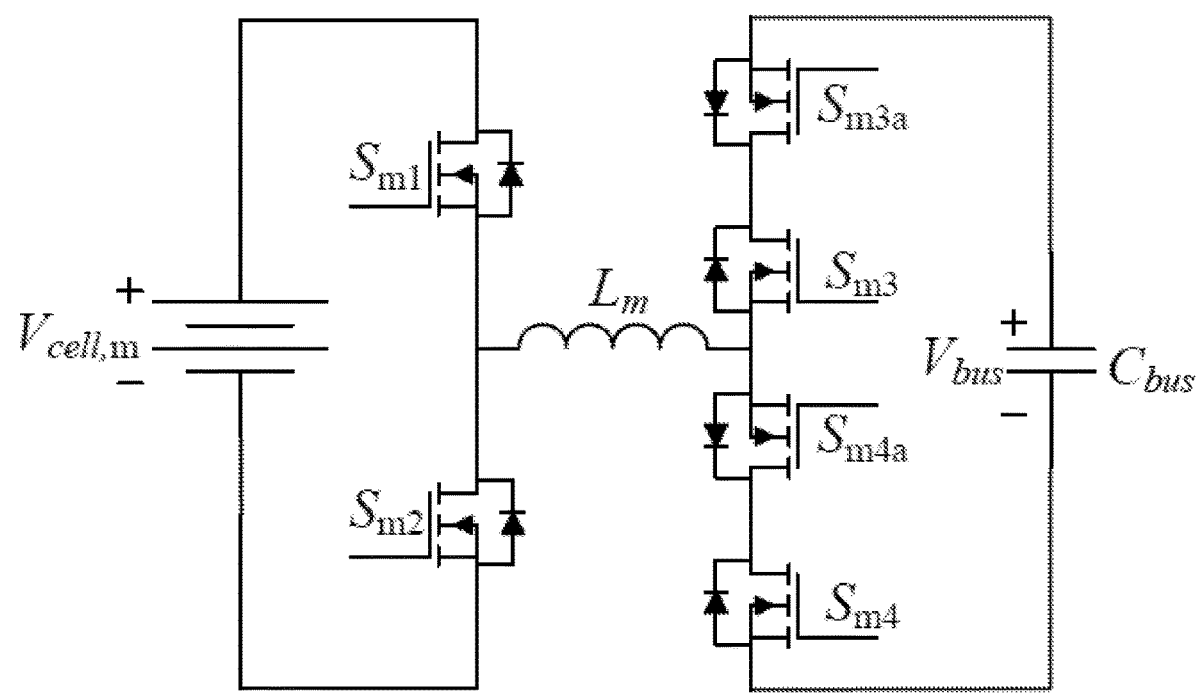
FIG. 19 two MOSFETs connected back-to-back, that construct the switches of the embodiment of FIG. 15.

The use of a non-isolated topology forces the balancing modules to operate sequentially. This is carried out to avoid undesired current loops that may occur as a result of two distant modules that are operated at the same time. In addition, according to a preferred embodiment of the present invention, to eliminate additional current loops through the body diodes of the switches in the non-active modules when other modules are active, the switches on the bus side (i.e. near $V_{bus}$) are realized as four-quadrant devices, constructed using two MOSFETs connected back-to-back, as depicted in FIG. 19.

Figure 20:
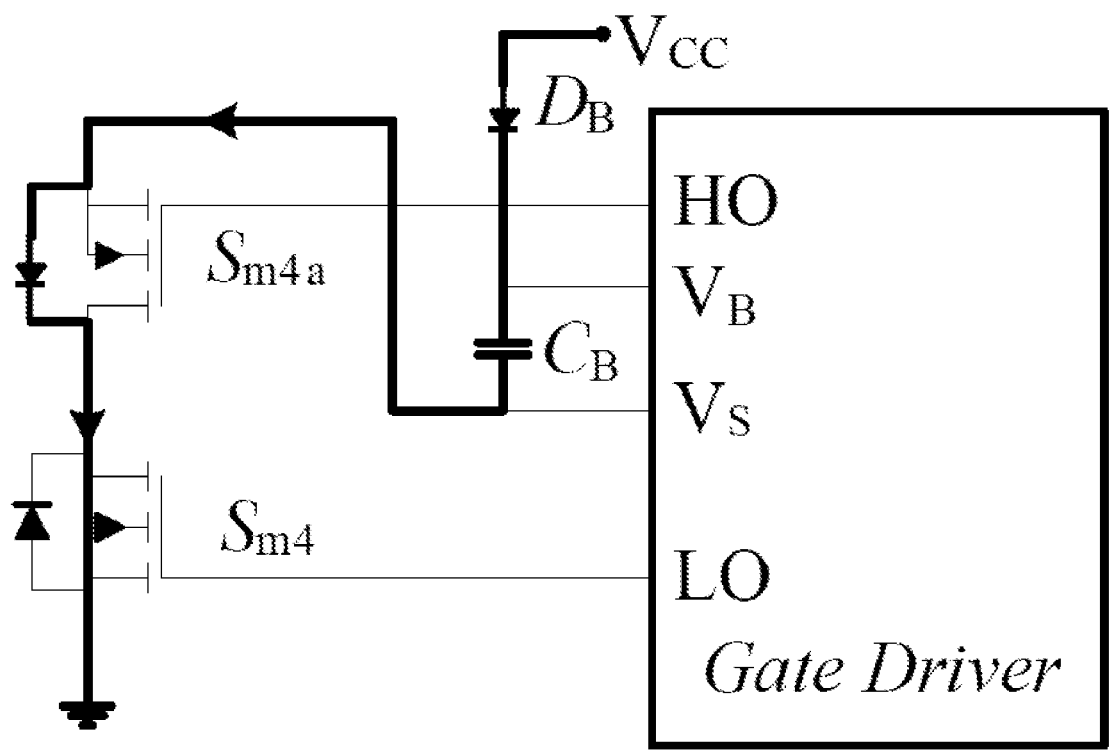
FIG. 20 shows an example of an implementation of a bidirectional switch and an independent gate driver per transistor using a conventional bootstrapped driver, that can be used in the embodiment of FIG. 15.

The use of bidirectional switches presents an additional challenge related to the sensorless operation of this embodiment. The body diodes of the switches conduct due to the continuity of the inductors current, and the specific body diodes that are forward biased depend on the current direction (e.g. $S_{13}$ in FIG. 16b and $S_{14}$ in FIG. 16d). Therefore, to still benefit from the natural diode conduction, the bidirectional switches need to operate as diodes during the off time of the balancing operation. This fact rules out the possibility of driving them with the same gate signal and each should have its own driver with respect to the proper source potential. According to one embodiment, such configuration is realized by a simple bootstrapped driver as shown in FIG. 20. This Figure shows an example of an implementation of a bidirectional switch and an independent gate driver per transistor using a conventional bootstrapped driver (wherein the bootstrap capacitor's current charging loop is marked in by bold lines). In this configuration, the bootstrap capacitor is connected to the source of the upper MOSFET, and when the lower MOSFET is on, the capacitor is charged through two diodes: the bootstrap diode $D_B$ and body diode of the upper MOSFET, as highlighted. A similar arrangement is used for the switches $S_{m3}$ and $S_{m3a}$.

The main objective of the single inductor in the module is to limit the balancing current as a result of two low-impedance sources (the cell and the bus capacitor) connect to each other. Therefore, the inductance value L, the on time of the switches $T_{on}$, and the voltage difference between the battery cell voltage and the bus capacitor voltage $\Delta V$ govern the current that flows through the inductor in every switching cycle. In the following analysis it is assumed that the inductors of all the balancing modules are equal to inductance L.

Since each balancing module operates in DCM, the peak inductor current $I_{pk}$ and the inductor's current ripple $\Delta I_L$ are equal. As described earlier, the current flows through two inductors and therefore $I_{pk}$ and $\Delta I_L$ are given by:

$$I_{pk} = \Delta I_L = \frac{\Delta V}{2L} T_{on} \quad (10)$$

After turning off the switches, the time it takes for the current to ramp down back to zero can be expressed as:

$$T'_{off} = \frac{\Delta V}{\min(V_{cell}, V_{bus})} T_{on}, \quad (11)$$

and the average inductors current in a single switching cycle is:

$$I_L = \frac{\Delta V}{4L}\left(1 + \frac{\Delta V}{\min(V_{cell}, V_{bus})}\right)\frac{T_{on}^2}{T_s}, \quad (12)$$

where $T_s$ is the switching period.

As can be seen in (12), in the case that the cells are balanced and no voltage difference exists, i.e. $\Delta V=0$, the inductors current is zero and no energy circulates through the system, resulting in a minimal quiescent power loss. To expedite the convergence time, small inductance values may be selected. This is due to the higher current that can be delivered. However, it would require a design with lower stray resistance (switches and inductors) to avoid high conduction losses during balancing.

To guarantee the system's operation in DCM, $T_{on}$ has to be limited. The maximum on time $T_{on,max}$ depends on the given maximum voltage difference $\Delta V_{max}$ and the minimum voltage between the battery and the bus, and it is given by:

$$T_{on,max} = \frac{\min(V_{cell}, V_{bus})/\Delta V_{max}}{1 + \min(V_{cell}, V_{bus})/\Delta V_{max}} T_s, \quad (13)$$

This implies that for a case where $\Delta V$ is expected to be high, the upper limit of $T_{on}$ should be set sufficiently low to limit the peak current. However, the more practical case is where the string has relatively small voltage differences, i.e. $\Delta V$ is relatively low, in the range of tens of millivolts (in particular in Li-ion cells). In this case, the upper limit for the on time (along with the inductance value) would determine the total convergence time.

The capacitance of the bus capacitor that acts as an energy buffer between the cells should be sufficiently low with respect to the capacity of the batteries. This is to assure relatively fast convergence to the cells' voltages average value, as in (7). On the other hand, a small voltage ripple is desired at the bus voltage to minimize its effect on the balancing operation. Therefore, the minimum bus capacitance that should be used must satisfy the condition:

$$V_{ripple} << \Delta V \quad (14)$$

where $V_{ripple}$ is the voltage ripple of the bus capacitor. Using (12), (13) and after some manipulations, condition (14) translates into:

$$C_{bus} >> \frac{T_{on,max}^2}{4L}, \quad (15)$$

where $f_s$ is the switching frequency.

Experiments

In order to demonstrate the balancing operation of the third aspect of the present invention and to verify the corresponding theoretical analysis and simulation results, several experiments have been carried out using two cells connected in series, emulated by large capacitors. Table III shows the components types and values of the experimental setup. The balancing time between the cells is shared equally, where one cell is being balanced for a switching cycle and the other is being balanced in the consecutive switching cycle.

TABLE III

EXPERIMENTAL PROTOTYPE VALUES

| Component | Value |
|---|---|
| Batteries (emulated by large capacitors) | 60 mF |
| Module inductors $L_1$, $L_2$ | 3.3 µH |
| MOSFETs $S_{m1}$-$S_{m8}$ | 30 V, 5.7 mΩ |

TABLE III-continued

EXPERIMENTAL PROTOTYPE VALUES

| Component | Value |
|---|---|
| Bus capacitor $C_{bus}$ | 100 μF |
| Balancing operation on time $T_{on}$ | ½ $f_s$ |
| Switching frequency $f_s$ | 100 kHz |

Figure 21:
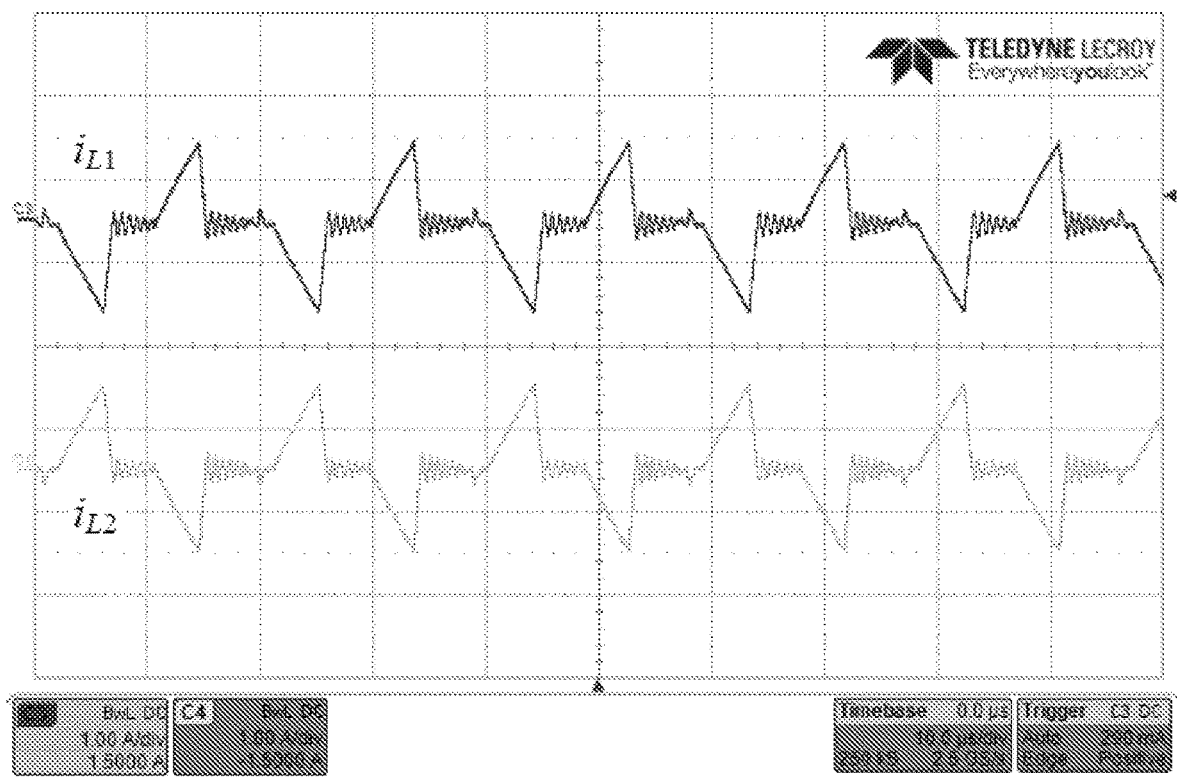
FIG. 21 presents a steady-state operation current-waveforms in $L_1$ and $L_2$ for unbalanced cells, in the embodiment of FIG. 15.

FIG. 21 presents the steady-state operation current waveforms in $L_1$ and $L_2$ for unbalanced cells with $T_{on}=0.5\ T_s$. The measurements are taken when the cells' voltages are $V_{cell,1}=8V$ and $V_{cell,2}=12V$ and the bus voltage is $V_{bus}=10V$. Since the cells voltages are symmetrical with respect to the bus voltage (same voltage difference, but opposed polarity), the currents $i_{L1}$ and $i_{L2}$ are 180° out of phase and have the same magnitude. FIG. 21 shows the inductors currents for an unbalanced steady-state operation.

Figure 22:
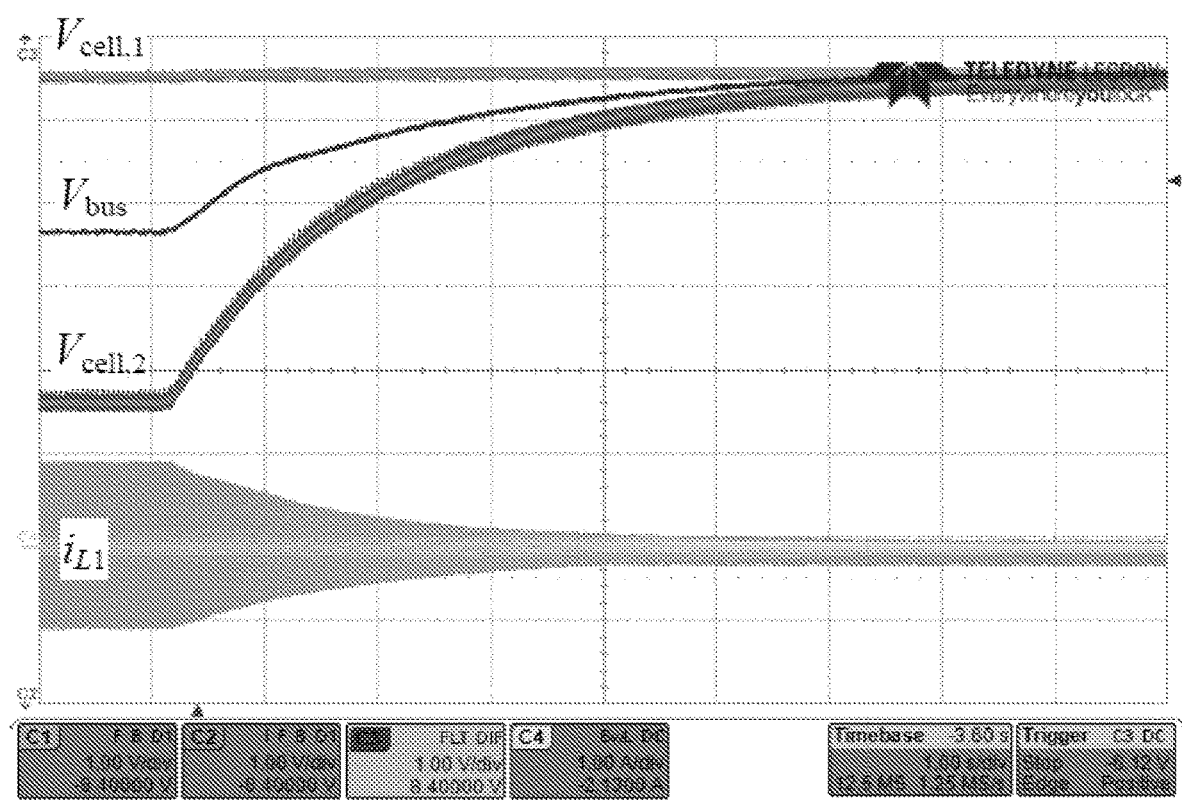
FIG. 22 shows a convergence of the cells' voltages in the embodiment of FIG. 15, when cell no. 1 is connected to a 12V DC power supply.

FIG. 22 shows convergence of the cells' voltages when cell no. 1 is connected to a 12V DC power supply. As can be observed, when the convergence starts, the balancing system charges cell no. 2 and as a consequence $V_{Cell,2}$ rises, while $V_{bus}$ changes according to the instantaneous cell's voltages average value, in agreement with (7). Also, the inductor current decreases as the cells' voltages converge and ΔV decreases, as predicted by (12). Convergence of the two cells is depicted in FIG. 30. Also here, after the cells have been balanced, the inductor current reaches zero since ΔV=0. More specifically, FIG. 22, shows the convergence of the cells' voltages when Vcell,1 is connected to a 12V DC power supply; Vcell,2 and Vbus converge toward Vcell,1. C1—Vcell,1 (1V/div), C2—Vcell,2 (1V/div), C3—Vbus (1V/div), C4—inductor current iL1 (1A/div). Time scale is div.

As shown the present invention discloses a hybrid-hierarchical system that are characterized by small component count. In the first and second aspects of the invention, the number of the controlled switches is significantly reduced, as several of the switches a commonly used by both the local balancing scheme and by the global scheme. In the third aspect, the circuit does not at all use a transformer, nor local capacitors, wherein each module has only one inductor, while in order to carry out the invention, during each balancing period the balancing circuit is closed through the inductor of the adjacent module. Furthermore, in the present invention the DCM operation and the fact that no energy circulates in the system when the cells are balanced result in extremely low quiescent power loss. The control and operation of the modules is simple and does not require any current or voltage sensors to regulate or control the system. The results of the experimental prototypes have been found in excellent agreement with the theoretical analysis and showed fast convergence of the cells to negligibly small voltage difference.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A hierarchical-hybrid system for balancing a series of cells, said system being divided into a plurality of m modules, each module having k cells, the system comprising:
one or two central cells and additional neighboring cells in each module, each neighboring cell being adjacent to one of said central cells;
a local capacitor for each neighboring cell, within a local section of each module;
one global capacitor at a global section which is common to all said modules;
a plurality of controlled switches;
a controller configured to periodically, repeatedly, and alternately open and close certain switches from said controlled switches to: (a) within each module, connect each local capacitor in parallel to a respective one of said neighboring cells; (b) within each module, connect each said local capacitors in parallel to the central cell provided that one central cell exists, or connect each local capacitor to another central cell provided that two central cells exist, respectively; and (c) within the system, connect all said central cells of all modules separately or simultaneously to said global capacitor;
wherein each module further comprises connecting circuitry which in turn comprises one or more isolation elements that connects said local section of the module to said global section which is common to all the modules.

2. The system of claim 1, wherein said controller is configured to alternate the states of said controlled switches at a high-frequency rate.

3. The system of claim 1, wherein said isolation element is a transformer comprising primary and secondary sides, while said global capacitor is located at the secondary side.

4. The system of claim 3, further comprising a serial inductance at each of said primary sides of the transformer.

5. The system of claim 4, wherein said serial inductance in the primary side of the transformer is formed either by a leakage inductance of the primary coil of the transformer or by an additional inductor in series to the primary of the transformer.

6. The system of claim 4, further comprising an additional serial capacitor, wherein said additional serial capacitor and said serial inductor are configured to form a serial resonant-type circuitry.

7. A method for balancing a series of cells, the method comprising:
dividing the series of cells into a plurality of m modules, each module comprising one or two central cells, and additional neighboring cells, each neighboring cell being adjacent to one of said central cells;
providing a local capacitor for each neighboring cell, within a local section of each module;
providing connecting circuitry in each module which in turn comprises one or more isolation elements that connect said local section of the module to said global section which is common to all the modules, and further providing within the global section a global capacitor;
providing a plurality of controlled switches;
periodically, repeatedly, and alternately opening and closing each time certain switches from said controlled switches to: (a) connect each local capacitor in parallel to a respective one of said neighboring cells; (b) within each module, connect each said local capacitors in parallel to the central cell provided that one central cell exists, or connect each local capacitor to another central cell, respectively, provided that two central cells exist; and (c) connect said central cells of all the modules separately or simultaneously to said global capacitor.

8. The method of claim 7, wherein the period of opening and closing is divided into two intervals: $t_1=t_{on1}+t_{off1}$ and $t_2=t_{on2}+t_{off2}$, wherein:
- during $t_{on1}$ each neighboring cell is balanced against a local capacitor, tone respectively, and the one or more central cells are balanced against the global capacitor;
- during $t_{off1}$ a flow of current is zeroed;
- during $t_{on2}$ both local capacitors are balanced against the one or more central cells, and the one or more central cells are again balanced against the global capacitor; and
- during $t_{off2}$ the flow of current is again zeroed.

9. The method of claim 7, wherein during operation said local capacitors within each circuit serially balance the cells in the circuit, and said global capacitor parallelly balance the central cells of all the circuits.

10. The method of claim 7, wherein during operation said local capacitors within each circuit parallelly balance respective cells of the circuit, and said global capacitor serially balances the central cells of all the circuits.

11. The method of claim 7, wherein during operation charge quantities that are proportional to a difference between a voltage of a respective central cell of the circuit and between a voltage of said global capacitor are transferred by means of said connecting circuitry.

12. The method of claim 7, further comprising periodically altering the states of the controlled switches in a cyclical frequency rate, while at each said frequency cycle a charge quantity is transferred from cells or capacitors of higher voltage to cells or capacitors of lower voltage, respectively.

13. The method of claim 7, further comprising:
- providing an additional serial capacitor at a primary side of the isolation element which together with an additional inductance at the primary side forms a serial resonant-type circuitry; and
- setting the period of opening and closing of the switches to result in a resonance operation.

* * * * *